US011330465B2

(12) United States Patent
Xin et al.

(10) Patent No.: US 11,330,465 B2
(45) Date of Patent: May 10, 2022

(54) METHOD AND APPARATUS FOR INDICATING CONTROL INFORMATION IN A WIRELESS FRAME

(71) Applicants: Yan Xin, Kanata (CA); Sheng Sun, Kanata (CA); Osama Aboul-Magd, Kanata (CA); Kwok Shum Au, Ottawa (CA); Jung Hoon Suh, Kanata (CA)

(72) Inventors: Yan Xin, Kanata (CA); Sheng Sun, Kanata (CA); Osama Aboul-Magd, Kanata (CA); Kwok Shum Au, Ottawa (CA); Jung Hoon Suh, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 15/480,044

(22) Filed: Apr. 5, 2017

(65) Prior Publication Data

US 2017/0332277 A1    Nov. 16, 2017

Related U.S. Application Data

(60) Provisional application No. 62/444,055, filed on Jan. 9, 2017, provisional application No. 62/334,749, filed on May 11, 2016.

(51) Int. Cl.
*H04L 29/06* (2006.01)
*H04W 72/04* (2009.01)
(Continued)

(52) U.S. Cl.
CPC ............. *H04W 28/06* (2013.01); *H04L 69/22* (2013.01); *H04W 80/02* (2013.01); *H04W 84/12* (2013.01)

(58) Field of Classification Search
None
See application file for complete search history.

(56) References Cited

U.S. PATENT DOCUMENTS

| 10,187,497 B1* | 1/2019 | Sun ..................... H04L 69/22 |
| 2006/0041576 A1 | 2/2006 | Ito |

(Continued)

FOREIGN PATENT DOCUMENTS

| CN | 102474481 A | 5/2012 |
| CN | 102484522 A | 5/2012 |

(Continued)

OTHER PUBLICATIONS

International Search Report dated May 17, 2017 for corresponding International Application No. PCT/CN2017/081229 filed Apr. 20, 2017.

(Continued)

*Primary Examiner* — Duc T Duong

(57) ABSTRACT

A method, apparatus and system for transmitting control information in a header of a physical protocol data unit (PPDU), such as an IEEE 802.11 compliant PPDU. Embodiments include indicating control features in an EDMG PPDU for Wireless LAN communications. The method and system may include overloading at least one bit of a Scrambler Initialization Field in the PPDU header (e.g. the PHY header) to convey control information, as well as to be used to initialise the scrambler shift register. The same header bits are thus used for both purposes. Examples of control information include a primary channel, channel width or MIMO configuration to be used in further communication.

29 Claims, 28 Drawing Sheets

(51) Int. Cl.
*H04W 80/02* (2009.01)
*H04W 28/06* (2009.01)
*H04L 69/22* (2022.01)
*H04W 84/12* (2009.01)

(56) References Cited

U.S. PATENT DOCUMENTS

| | | | |
|---|---|---|---|
| 2008/0025509 A1 | 1/2008 | Van De Ven | |
| 2009/0122987 A1* | 5/2009 | Mo | H04L 1/1685 380/277 |
| 2012/0127940 A1 | 5/2012 | Lee et al. | |
| 2012/0287915 A1 | 11/2012 | Cheong et al. | |
| 2013/0142094 A1 | 6/2013 | Homchaudhuri et al. | |
| 2014/0003415 A1* | 1/2014 | Asterjadhi | H04W 40/24 370/349 |
| 2015/0016426 A1* | 1/2015 | Merlin | H04W 72/0466 370/335 |
| 2015/0139214 A1 | 5/2015 | Noh et al. | |
| 2015/0201433 A1* | 7/2015 | Asterjadhi | H04L 69/321 370/328 |
| 2015/0282183 A1* | 10/2015 | Sverdlov | H04L 25/03866 370/329 |
| 2015/0373587 A1* | 12/2015 | Josiam | H04W 28/20 370/338 |
| 2016/0014725 A1* | 1/2016 | Yu | H04W 72/0453 370/329 |
| 2016/0045872 A1 | 2/2016 | Kashihara | |
| 2016/0094689 A1* | 3/2016 | Vainapel | H04L 69/28 370/338 |
| 2016/0286011 A1* | 9/2016 | Kasher | H04L 69/22 |
| 2016/0316455 A1* | 10/2016 | Asterjadhi | H04W 72/04 |
| 2016/0353357 A1* | 12/2016 | Asterjadhi | H04L 5/0055 |
| 2017/0104563 A1* | 4/2017 | Lee | H04L 5/0044 |
| 2017/0164241 A1* | 6/2017 | Kasher | H04L 5/00 |
| 2017/0280354 A1* | 9/2017 | Huang | H04L 1/0081 |
| 2017/0289987 A1* | 10/2017 | Seok | H04W 74/00 |
| 2018/0048509 A1* | 2/2018 | Huang | H04L 27/2602 |
| 2018/0115443 A1* | 4/2018 | Mauritz | H04L 1/0042 |

FOREIGN PATENT DOCUMENTS

| | | |
|---|---|---|
| CN | 102939737 A | 2/2013 |
| CN | 103891233 A | 6/2014 |
| CN | 104025488 A | 9/2014 |
| CN | 104378149 A | 2/2015 |
| CN | 104429000 A | 3/2015 |
| EP | 3151497 A1 | 4/2017 |
| JP | 2000031980 A | 1/2000 |
| JP | 2004153694 A | 5/2004 |
| RU | 2439668 C2 | 1/2012 |
| WO | 2013082603 A1 | 6/2013 |
| WO | 2014148084 A1 | 9/2014 |
| WO | 2015094257 A1 | 6/2015 |

OTHER PUBLICATIONS

IEEE Standard for Information technology—Telecommunication and information exchange between systems; Local and metropolitan area networks—Specific requirements, Part 11: Wireless LAN medium Access Control (MAC) and Physical Layer (PHY) Specifications, Amendment 3: Enhancements for Very High Throughput in the 60 GHz Band, IEEE Std. 802.11ad-2012, Dec. 28, 2012.

Cordeiro, C et al., IEEE 802.11-16/0105r0, "Adding control trailer to control mode PPDUs," Jan. 17, 2016.

IEEE Draft P802.11REVmc_D5.1, Draft Standard for Information technology—Telecommunications and information exchange between systems Local and metropolitan area networks—Part 11: Wireless LAN Medium Access Control (MAC) and Physical Layer (PHY) Specifications, Feb. 1, 2016.

"Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—"; IEEE P802.11ay1 ™/D0.3, Mar. 2017.

"IEEE Standard for Information technology—Telecommunications and information exchange between systems Local and metropolitan area networks—Specific requirements"; IEEE Std 802.11ad™—Dec. 2012.

"Adding control trailer to control mode PPDUs"; IEEE 802.11-16/0105r0, Jan. 2016.

Carlos Cordeiro (Intel), Specification Framework for TGay, IEEE 802.11-15/1358r3, IEEE, Mar. 21, 2016, total 4 pages.

* cited by examiner

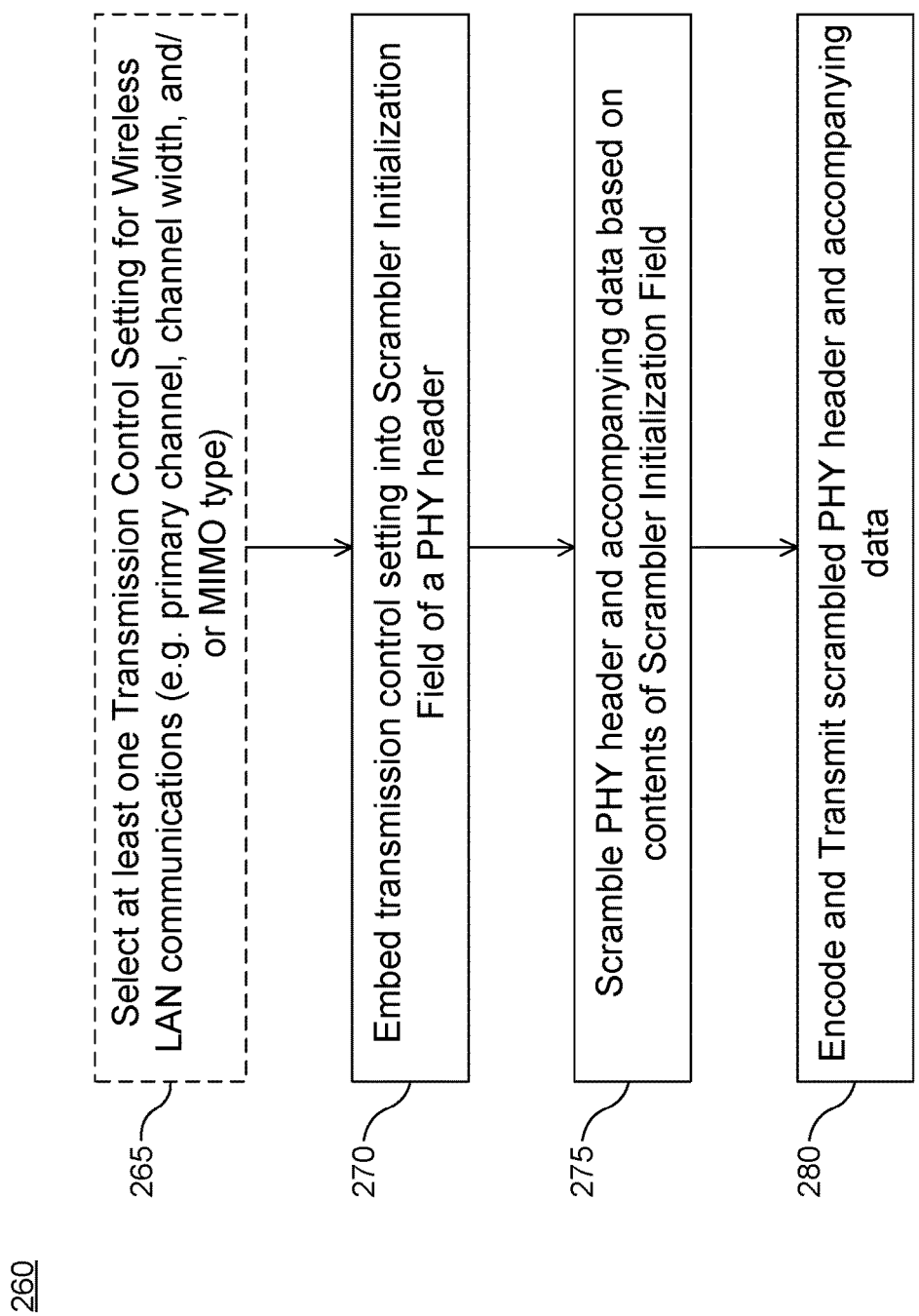

| Bits B1 B2 | Bits B3 B4 | Primary Channel | Bandwidth (GHz) | Channel |
|---|---|---|---|---|
| 00 | Random | Channel Transmitting PPDU | 2.16 | Channel Transmitting PPDU |
| 01 | 00 | #1 | 4.32 | #9 |
| 01 | 01 | #2 | 4.32 | #9 |
| 01 | 10 | #3 | 4.32 | #11 |
| 01 | 11 | #4 | 4.32 | #11 |
| 10 | 00 | #1 | 6.48 | #17 |
| 10 | 01 | #2 | 6.48 | #17 |
| 10 | 10 | #3 | 6.48 | #17 |
| 10 | 11 | Reserved | Reserved | Reserved |
| 11 | 00 | #1 | 8.64 | #21 |
| 11 | 01 | #2 | 8.64 | #21 |
| 11 | 10 | #3 | 8.64 | #21 |
| 11 | 11 | #4 | 8.64 | #21 |

Control PHY: Primary Channel/Bandwidth

FIG. 9

| B3<br>[DYN_BANDWIDTH] | Static/Dynamic<br>Bandwidth | B2 B1<br>[CH_BANDWIDTH] | Channel<br>Bandwidth<br>(GHz) |
|---|---|---|---|
| Random | Static/Dynamic | 00 | 2.16 |
| 0 | Static | 01 | 4.32 |
| 0 | Static | 10 | 6.48 |
| 0 | Static | 11 | 8.64 |
| 1 | Dynamic | 01 | 4.32 |
| 1 | Dynamic | 10 | 6.48 |
| 1 | Dynamic | 11 | 8.64 |

Control PHY: Static/Dynamic Bandwidth/Channel Bandwidth

FIG. 10

| Bits B0 B1 | Bits B2 B3 | Primary Channel | Bandwidth (GHz) | Channel |
|---|---|---|---|---|
| 00 | Random | Channel Transmitting PPDU | 2.16 | Channel Transmitting PPDU |
| 01 | 00 | #1 | 4.32 | #9 |
| 01 | 01 | #2 | 4.32 | #9 |
| 01 | 10 | #3 | 4.32 | #11 |
| 01 | 11 | #4 | 4.32 | #11 |
| 10 | 00 | #1 | 6.48 | #17 |
| 10 | 01 | #2 | 6.48 | #17 |
| 10 | 10 | #3 | 6.48 | #17 |
| 10 | 11 | Reserved | Reserved | Reserved |
| 11 | 00 | #1 | 8.64 | #21 |
| 11 | 01 | #2 | 8.64 | #21 |
| 11 | 10 | #3 | 8.64 | #21 |
| 11 | 11 | #4 | 8.64 | #21 |

SC PHY and OFDM PHY: Primary Channel/Bandwidth

FIG. 11

| B2 [DYN_BANDWIDTH] Static/Dynamic Bandwidth | B1 B0 [CH_BANDWIDTH] | Channel Bandwidth (GHz) |
|---|---|---|
| Random | 00 | 2.16 |
| 0 | 01 | 4.32 |
| 0 | 10 | 6.48 |
| 0 | 11 | 8.64 |
| 1 | 01 | 4.32 |
| 1 | 10 | 6.48 |
| 1 | 11 | 8.64 |

SC/OFDM PHY: Static/Dynamic Bandwidth/Channel Bandwidth

FIG. 12

| B4 B5 | MIMO |
|---|---|
| 00 | SISO |
| 01 | MIMO 2X2 |
| 10 | MIMO 3X3 |
| 11 | MIMO 4X4 |

SC PHY and OFDM PHY: MIMO

FIG. 13

| B4 B5 | |
|---|---|
| 00 | MIMO |
| 01 | SISO |
| 10 | 2X1 |
| 11 | 4X1 |
| | Reserved |

SC PHY and OFDM PHY: transmit diversity

FIG. 14

| Bit Field | | | | Definition |
|---|---|---|---|---|
| B1 (B0) | B2 (B1) | B3 (B2) | B4 (B3) | |
| 0 | 0 | Reserved | Reserved | Indicates the presence of the control trailer (see 30.3.7 in [1]). |
| 0 | 1 | Reserved | Reserved | Indicates the presence of the EDMG-Header-A field. This implies that the PPDU is an EDMG control mode PPDU. |
| 1 | Channel BW | | | When the PPDU contains an RTS, a DMG CTS or a DMG DTS frame, the Channel BW field indicates the bandwidth of the PPDU, Otherwise, the Channel BW field is reserved. The Channel BW field is defined e.g. in FIG. 16, where N is the value of the lowest channel number over which the PPDU is transmitted. |

Channel Bandwidth Indication in Control PHY Header

FIG. 15

| Desired Channel Bandwidth | Channel(s) making up desired channelization | | | | Channel BW Field value |
|---|---|---|---|---|---|
| | N | N11 | N12 | N13 | |
| 2.16 GHz | X | - | - | - | 0 |
| | - | X | - | - | |
| | - | - | X | - | |
| | - | - | - | X | |
| 4.32 GHz | X | X | - | - | 1 (N is even) |
| | - | - | X | X | |
| 4.32 GHz | X | - | - | - | 2 (N is odd) |
| | - | - | X | X | |
| 6.48 GHz | X | X | X | - | 3 (N is even) |
| 6.48 GHz | X | X | X | - | 4 (N is odd) |
| 8.64 GHz | X | X | X | X | 5 |

"X" indicates channel is used
"-" indicates channel is not used

Channel Bandwidth Indication in Control PHY Header

FIG. 16

| Bit Field | | | | Definition |
|---|---|---|---|---|
| B1 (B0) | B2 (B1) | B3 (B2) | B4 (B3) | |
| 0 | 0 | Pseudo Random | Pseudo Random | Indicates the presence of the control trailer (see 30.3.7 in [1]). |
| 0 | 1 | Pseudo Random | Pseudo Random | Indicates the presence of the EDMG-Header-A field. This implies that the PPDU is an EDMG control mode PPDU. |
| 1 | Channel BW | | | When the PPDU contains an RTS, a DMG CTS or a DMG DTS frame, the Channel BW field indicates the bandwidth of the PPDU, Otherwise, the Channel BW field is reserved. The Channel BW field is defined e.g. in FIG. 16, where N is the value of the lowest channel number over which the PPDU is transmitted. |

Channel Bandwidth Indication in Control PHY Header

FIG. 17

| Desired channel bandwidth | Channel allocations (channel BW: 2.16 GHz) | Channel BW field (B1B2B3) value |
|---|---|---|
| 2.16 GHz | N (i.e., Ch. 1, 2, 3, 4) | 0 |
| 4.32 GHz | (N&(N+1)) (i.e., Ch.1-2, Ch.2-3, Ch.3-4) | 1 |
| 6.48 GHz | (N&(N+1)&(N+2)) (i.e., Ch.1-3, Ch.2-4) | 2 |
| 8.64 GHz | (N&(N+1)&(N+2)&(N+3)) (i.e., Ch.1-4) | 3 |
| 2.16 + 2.16 (adjacent channels) | (N, (N+1)) (i.e., Ch.1+Ch.2, Ch.2+Ch.3, Ch.3+Ch.4) | 4 |
| 2.16 + 2.16 (separated by 1 channel) | (N, (N+2)) (i.e., Ch.1+Ch.3, Ch.2+Ch.4) | 5 |
| 4.32 + 4.32 | (N&(N+1), (N+2)&(N+3)) (i.e., Ch.1-2 + Ch.3-4) | 6 |
| Reserved |  | 7 |

Definition for Channel BW field in bit field B1 B2 B3

FIG. 18

| Desired channel bandwidth | Channel allocations (channel BW: 2.16 GHz) | Channel BW field (B1B2B3) value |
|---|---|---|
| 2.16 GHz | N (i.e., Ch. 1, 2, 3, 4, 5, or 6) | 0 |
| 4.32 GHz | (N&(N+1)) (i.e., Ch.1-2, Ch.2-3, Ch.3-4, Ch.4-5, Ch.5-6) | 1 |
| 6.48 GHz | (N&(N+1)&(N+2)) (i.e., Ch.1-3, Ch.2-4, Ch.3-5, Ch.4-6) | 2 |
| 8.64 GHz | (N&(N+1)&(N+2)&(N+3)) (i.e., Ch.1-4, Ch.2-5, Ch.3-6) | 3 |
| 2.16 + 2.16 (adjacent channels) | (N, (N+1)) (i.e., Ch.1+Ch.2, Ch.2+Ch.3, Ch.3+Ch.4, Ch.4+Ch.5, Ch.5+Ch.6) | 4 |
| 2.16 + 2.16 (separated by 1 channel) | (N, (N+2)) (i.e., Ch.1+Ch.3, Ch.2+Ch.4, Ch.3+Ch.5, Ch.4+Ch.6) | 5 |
| 4.32 + 4.32 (adjacent channels) | (N&(N+1), (N+2)&(N+3)) (i.e., Ch.1-2 + Ch.3-4, Ch.2-3 + Ch.4-5, Ch.3-4 + Ch.5-6) | 6 |
| 4.32 + 4.32 (separated by 1 channel) | (N&(N+1), (N+3)&(N+4)) (i.e., Ch.1-2 + Ch.4-5, Ch.2-3 + Ch.5-6) | 7 |

Definition for Channel BW field in bit field B1 B2 B3

FIG. 19

| Bit number | Field name | Definition |
|---|---|---|
| B0 | IsSC | If set to 1, this field indicates that the PSDU is modulated using SC (see 30.5 in [1]). Otherwise if set to 0, this field indicates that the PSDU is modulated using OFDM (see 30.6 in [1]). If modulated using SC, the PPDU is termed as EDMG SC (mode) PPDU. If modulated using OFDM, the PPDU is termed as EDMG OFDM (mode) PPDU. |
| B1 | IsSISO | If set to 1, this field indicates that the PPDU is a single stream PPDU. Otherwise, the PPDU encodes more than one stream. |
| B2-B3 | GI/CP Length | For an EDMG SC PPDU, this field indicates the type of GI used in the PPDU (see 30.5.6 in [1]) and is set as follows: set to 0 for short GI, set to 1 for normal GI, and set to 2 for long GI, Value 3 is reserved. |

FIG. 20

Indications defined in Last RSSI field in L-Header of EDMG SC or EDMG OFDM mode

| Field | Number of bits | Start bit | Description |
|---|---|---|---|
| Number of SS | 3 | 38 | The value of this field plus one indicates the number of SSs transmitted in the PPDU. |

Indications Number of Spatial Streams defined in EDMG-Header-A of EDMG SC mode

FIG. 21

| Bit Field | | | | | | | | Definition |
|---|---|---|---|---|---|---|---|---|
| B0 | B1 | B2 | B3 | B4 | B5 | B6 | B7 | |
| Random | | | | | Number of SS | | | The value of B5 B6 B7 plus one indicates the number of SSs transmitted in the PPDU. |

Indication of MIMO configuration in L-Header of EDMG SC and EDMG OFDM mode

FIG. 22

METHOD AND APPARATUS FOR INDICATING CONTROL INFORMATION IN A WIRELESS FRAME

CROSS-REFERENCE TO RELATED APPLICATIONS

This disclosure claims priority from U.S. Provisional Patent Application No. 62/334,749 filed on May 11, 2016 and to U.S. Provisional Patent Application No. 62/444,055 filed on Jan. 9, 2017, both of which are herein incorporated by reference.

FIELD

The present disclosure relates to an apparatus, system, and method for communicating between Wireless LAN wireless stations (STAs). In particular, the present disclosure relates to an apparatus, system, and method for indicating enhanced directional multi-Gigabit (EDMG) features in a Wireless LAN frame.

BACKGROUND

With the introduction of Wireless LAN radio/modems that allow for larger bandwidth communications, such as in EDMG communications, there are additional communication channel features that allow for a range of channels to be established between STAs. Accompanying the additional communication channel features is a need to exchange corresponding additional control information in order to coordinate, among other options, selection of a primary channel, static/dynamic channel bandwidth, multiple-input multiple-output (MIMO) configuration type, and/or transmit diversity setting in order to establish the channel for the communication exchange.

One option for exchanging the additional control information is to add new control bits to a header that corresponds to the additional communication channel features. A problem with this option is that it may require a longer Control header with an increase in complexity of both transmitter and receiver because the additional control bits may require additional coding to error-protect those bits, and may cause problems when interoperating with legacy STAs. Another option for exchanging additional control information is to append the information in a Control trailer (See, for instance the IEEE document numbered IEEE 802.11-16/0105r0, and entitled "Adding control trailer to control mode PPDUs," Jan. 17, 2016, by C. Cordeiro and A. Kasher, referred to herein as IEEE 802.11-16/0105r0. A difficulty with using such a Control trailers is that it can inefficiently add additional redundant bits to the frame). A difficulty with using Control trailers is, as currently contemplated, they would inefficiently add additional redundant bits to the frame. Accordingly, there is a need for a system and apparatus that allows for efficiently exchanging the additional control information, while still presenting a backward compatible Control frame. In an aspect there is a need for a backward compatible Control frame that conveys additional control information without relying upon a Control trailer to carry that information.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the present disclosure, there is provided an apparatus, system, and method for communicating between Wireless LAN wireless stations (STAs). In particular, embodiments of the present disclosure relates to an apparatus, system, and method for an EDMG STA to transmit Control frames and EDMG single carrier (SC) and EDMG orthogonal frequency division multiplexing (OFDM) frames that include information to indicate related EDMG features using the legacy portions of a frame structure that is backward compatible for legacy stations (STAs). In an aspect, the present disclosure relates to an apparatus, system, and method for an EDMG STA to transmit and exchange data frames in a manner that includes additional signaling to support the EDMG features the legacy portions of a frame while remaining backward compatibility to allow a legacy STA to decode the frames.

According to other embodiments of the present disclosure, there is provided a transmitter for transmitting a physical layer protocol data unit (PPDU) having a header, the header having a Scrambler Initialization Field. The transmitter includes at least a scrambler initializer and a scrambler. The scrambler initializer is configured to overload at least one bit of the Scrambler Initialization Field to carry control information. The scrambler is configured to scramble content in the header following the Scrambler Initialization Field and an associated MAC frame or a portion of the MAC frame based on a scrambler initialization value conveyed via the Scrambler Initialization Field. In one aspect, the control information may indicate at least one of: a primary channel to be used by the transmitter; a channel bandwidth to be used by the transmitter; and a MIMO type to be used by the transmitter. The scrambler initializer may overload all or fewer than all bits of the Scrambler Initialization Field to carry the control information.

In accordance with embodiments of the present disclosure there is provided a receiver for receiving a physical layer protocol data unit (PPDU) having a header, the header having a Scrambler Initialization Field. The receiver includes at least a decoder and a descrambler. The scrambling data extractor is configured to interpret at least one bit of the Scrambler Initialization Field as control information. The descrambler is configured to descramble the PPDU or a portion of the PPDU based on contents of the Scrambler Initialization Field. The control information may indicate at least one of: a primary channel to be used by the transmitter; a channel bandwidth to be used by the transmitter; and a MIMO type to be used by the transmitter.

In accordance with embodiments of the present disclosure there is provided a method for transmitting a physical layer protocol data unit (PPDU) having a header, the header having a Scrambler Initialization Field. The method includes, by a transmitter station having a scrambler initializer and a scrambler: overloading, using the scrambler initializer, at least one bit of the Scrambler Initialization Field to carry control information. The method further includes scrambling, using the scrambler, the PPDU or a portion of the PPDU based on a scrambler initialization value conveyed via the Scrambler Initialization Field. The control information may indicate at least one of: a primary channel to be used by the transmitter; a channel bandwidth to be used by the transmitter; and a MIMO type to be used by the transmitter.

In accordance with embodiments of the present disclosure there is provided a method for receiving a PPDU having a header, the header having a Scrambler Initialization Field.

The method includes, by a receiver having a scrambling data extractor and a descrambler: interpreting, using the scrambling data extractor, at least one bit of the Scrambler Initialization Field as control information; and descrambling, using the descrambler, the PPDU or a portion of the PPDU based on contents of the Scrambler Initialization Field. The control information may indicate at least one of: a primary channel to be used by the transmitter; a channel bandwidth to be used by the transmitter; and a MIMO type to be used by the transmitter.

BRIEF DESCRIPTION OF THE FIGURES

Further features and advantages of the present disclosure will become apparent from the following detailed description, taken in combination with the appended drawings, in which:

FIGS. 2A to 2C illustrate methods for transmitting data according to various embodiments of the present disclosure.

FIGS. 5A, 5B, and 5C illustrate example header formats of Control, OFDM and single carrier modes, respectively, in 802.11ad.

FIG. 9 illustrates a table showing the relationship between the Scrambler Initialization field when transmitted using Control PHY with the Primary Channel/Bandwidth.

FIG. 10 illustrates a table showing the relationship between the Scrambler Initialization field when transmitted using Control PHY with the Static/Dynamic Bandwidth/Channel/Bandwidth.

FIG. 11 illustrates a table showing the relationship between the Scrambler Initialization field when transmitted using EDMG SC PHY and EDMG OFDM PHY with the Primary Channel/Bandwidth.

FIG. 12 illustrates a table showing the relationship between the Scrambler Initialization field when transmitted using EDMG SC/OFDM PHY with the Static/Dynamic Bandwidth/Channel/Bandwidth.

FIG. 13 illustrates a table showing the relationship between the Scrambler Initialization field when transmitted using EDMG SC PHY and EDMG OFDM PHY with the MIMO.

FIG. 14 illustrates a table showing the relationship between the Scrambler Initialization field when transmitted using EDMG SC PHY and EDMG OFDM PHY with the transmit diversity.

FIG. 15 illustrates a Channel Bandwidth Indication in Control PHY Header.

FIG. 16 illustrates a Channel BW field definition in bit field B1 B2 B3 in Control PHY Header.

FIG. 17 illustrates an embodiment of Channel Bandwidth indication in Control PHY Header.

FIG. 18 illustrates an embodiment of a definition for Channel BW field in bit field B1 B2 B3 in Control PHY Header.

FIG. 19 illustrates an additional embodiment of a definition for Channel BW field in bit field B1 B2 B3 in Control PHY Header.

FIG. 20 illustrates a definition of bit allocation of Last RSSI field when transmitted using the EDMG SC or EDMG OFDM mode.

FIG. 21 illustrates a EDMG-Header-A field structure and definition for a SU PPDU.

FIG. 22 illustrates an embodiment of a definition of Scrambler Initialization field in DMG Header when transmitted using EDMG SC and EDMG OFDM mode.

It will be noted that throughout the appended drawings, like features are identified by like reference numerals.

DETAILED DESCRIPTION

Figure 1:
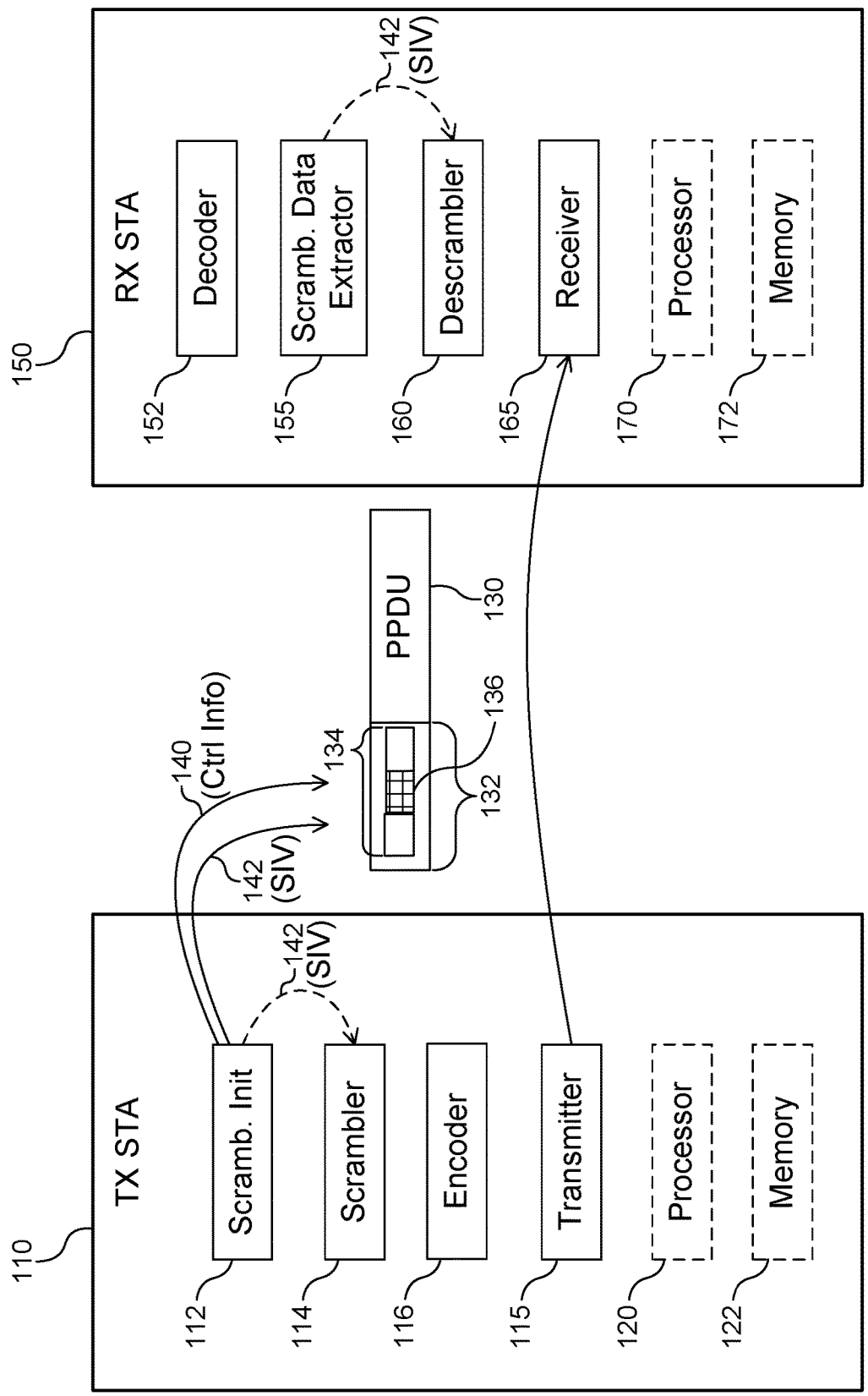
FIG. 1 illustrates a transmitting station and a receiving station, according to embodiments of the present disclosure.

Various acronyms as used herein are defined in the following non-exhaustive list:
AP: Access Point
DMG: Directional Multi-Gigabit
EDMG: Enhanced Directional Multi-Gigabit
OFDM: Orthogonal Frequency Division Multiplexing
PBSS: Personal Basic Service Set
PCP: PBSS Coordinate Point
PHY: Physical Layer
PPDU: Physical Layer Protocol Data Unit
PSDU: Physical Layer Service Data Unit
SC: Single Carrier
STA: wireless station, including AP and Non-AP Stations As will be readily understood, a signal such as used in IEEE 802.11 conveys a sequence of bits which are set by a transmitter station and interpreted by a receiver station. Setting a bit can refer to configuration, by a transmitting station, of a signal to be transmitted so that the bit will (more likely than not and subject to noise) be interpreted by a receiving station as a particular binary value. A bit can be set to either a '0' or a '1'. Interpreting a bit by a receiving station refers to processing the signal in an attempt to determine the intended value of the bit as set by the transmitting station. Encoding, modulating, demodulating and decoding of a signal in order to convey a sequence of bits can be performed in a variety of ways as would be readily understood by a worker skilled in the art.

As used herein, the term "overloading" refers to the configuration and usage of the same data (e.g. specified bits conveyed via a signal) for at least two different purposes. For example, a wireless signal which is interpreted as an IEEE 802.11 frame can include a portion which is interpreted and/or used in two different ways.

Embodiments of the present disclosure relate to overloading of portions of an IEEE 802.11 frame, such as bits of the frame header, so that the values conveyed by these overloaded portions are concurrently used for initialization of a scrambling operation as well as another purpose, such as to convey other control information. More particularly, embodiments of the present disclosure relate to overloading of bits of the Scrambler Initialization Field of a Physical Layer Protocol Data Unit (PPDU) carrying an IEEE 802.11 frame (e.g. an IEEE 802.11ay control frame or data frame). The frame can refer to a MAC layer frame. In some embodiments, some of these bits are overloaded in a given PPDU, while other ones of these bits are assigned values in a random or pseudo-random manner. As such, random or pseudo-random properties of values carried in the Scrambler Initialization Field can be at least partially retained. In other embodiments, all of these bits are overloaded in a given PPDU.

In some embodiments, the bits are overloaded to the same degree in all applicable PPDUs. In other embodiments, the number of overloaded bits can vary from PPDU to PPDU, for example on an as-needed basis or according to a schedule. It is noted that the Scrambler Initialization Field can refer to a collection of contiguous or non-contiguous bits, conveyed via a PPDU, which are used both for scrambler initialization purposes and another purpose. In particular, the Scrambler Initialization Field does not necessarily have to carry this particular name when referred to in a document describing operation of the transmitter and receiver.

In particular, bits of data carried in some or all applicable PPDUs (e.g. in the Scrambler Initialization Field of the header thereof) are used to support scrambling and descrambling operations, while some or all of these same bits of data are also used to convey other control information. This other control information can include, but is not necessarily limited to: control information used to support EDMG features (such as channel bonding features and MIMO features), a channel to be used for communication between wireless stations (such as a primary channel), a bandwidth of the channel (or PPDU), an indication of whether static or dynamic bandwidth allocation should be employed, a particular set of one or more channels to be used for communication (e.g. a channel allocation or set of channels making up a channelization), a type of MIMO to be used for communication, a transmit diversity configuration to be used in communication, a number of spatial streams being transmitted, or a combination thereof. For purposes of this disclosure, SISO is considered to be a special case of MIMO or transmit diversity in which one transmitting antenna and one receiving antenna are employed.

As such, in various embodiments, some or all bits of the Scrambler Initialization Field are used (set by the transmitting STA and interpreted by the receiving STA) to convey control information as specified above, while also being used for scrambling and descrambling operations for example as specified in existing, proposed versions of the IEEE 802.11 standard, as well as potentially being specified in future versions of the standard, or as specified or used in comparable standardized or non-standardized (existing or future) communication protocols.

Because the Scrambler Initialization Field is designed to operate with an arbitrary (e.g. random or pseudo-random) value, using this field to convey data which is meaningful for another purpose (i.e. overloading some or all bits of the field in some or all applicable PPDUs) is expected to have limited impact on communication operations and backward compatibility.

By overloading only part of the Scrambler Initialization Field, and/or by overloading the Scrambler Initialization Field in some but not all applicable PPDUs, at least some desirable "random" properties of the Scrambler Initialization Field can be retained, at least on average. Furthermore, if the overloaded data is sufficiently random or pseudo-random, at least some of the "random" properties of the Scrambler Initialization Field can be considered to be inherently retained, at least by some measures. The potential desirability of random or pseudo-random values conveyed by the Scrambler Initialization Field will be readily understood by a worker skilled in the art.

In some embodiments, overloaded bits conveyed via the Scrambler Initialization field can be made to exhibit pseudo-random properties by setting and interpreting the overloaded bits in a manner which varies pseudo-randomly, but which is commonly known to the transmitting and receiving stations. For example, the transmitting and receiving stations can access a commonly known sequence of bits which is considered to be random or pseudo-random, at least for practical purposes. The sequence of bits can be provided to the stations during an initialization operation, generated based on a commonly observed phenomenon, or extracted from a predetermined part of the frame being transmitted or a different message exchanged between the two stations. As each overloaded bit is being set by the transmitting station, it can be XORed with a bit taken from the commonly known sequence of bits. Likewise, as each overloaded bit is being interpreted by the receiving station, it can be XORed with the same bit taken from the commonly known sequence. Bits from the commonly known sequence can be used in order.

Because the bits of the Scrambler Initialization Field are used (via overloading) to convey other data (e.g. control information), the need for additional fields in the header is mitigated and backward compatibility is maintained, without necessarily relying upon a Control trailer to carry such other data.

Embodiments of the present disclosure can be applied to various frames which are used to communicate a scrambler initialization value. Examples of such (e.g. MAC layer) frames include control frames (Request to Send (RTS), Clear to Send (CTS), Acknowledgement (ACK) frames, etc.) and data frames.

According to an embodiment of the present disclosure, and with reference to FIG. 1, there is provided a transmitting wireless station 110, such as an access point (AP) or non-access point (non-AP) wireless station. The transmitting wireless station 110 includes at least a scrambler initializer 112 and a scrambler 114. The station 110 further includes a wireless transmitter 115. The station 110 may also include an error correction encoder 116, which can operate for example on the scrambled data. The station can further include components such as but not necessarily limited to a processor 120 and computer memory 122, or equivalent hardware.

The scrambler 114 is used to scramble the header information and the data frame. The scrambler initializer 112 is configured to embed the control information 140 into the Scrambler Initialization Field 134 carried by a header 132. The control information 140 may be embedded into a portion 136 of the Scrambler Initialization Field 134, or the control information 140 may be embedded into the entire Scrambler Initialization Field 134. The header 132 is part of a PHY protocol data unit (PPDU) 130 to be prepared and wirelessly transmitted by the station 110. The scrambler initializer 112 is also configured to deliver a scrambler initialization value (SIV) 142 into the Scrambler Initialization Field 134. As such, the Scrambler Initialization Field 134 is overloaded to convey the scrambler initialization value 142 which carries the control information 140 as well. As such, the scrambler initialization value 142 can contain the control information 140.

The scrambler 114 is configured to scramble the frame based on the scrambler initialization value 142. The scrambling is performed such that a receiver in receipt of the PPDU 130 can recover the scrambled frame by descrambling based on the scrambler initialization value 142, as conveyed via the Scrambler Initialization Field 134.

In various embodiments, scrambling and descrambling operations are symmetric in the sense that they operate based on the same scrambler initialization value in order to scramble and then descramble a header and a frame portion. In such embodiments, the scrambler initializer 112 and the scrambler 114 can share information so that the scrambler 114 will perform scrambling based on the same scrambler initialization value as is included into the header 132. For example, the scrambler initializer 112 can determine the scrambler initialization value 142 and pass it to the scrambler 114. A receiving wireless station in receipt of the PPDU 130, and hence in receipt of the scrambler initialization value (as included into the header 132) can then descramble the frame portion based on this value.

According to another embodiment of the present disclosure, and also with reference to FIG. 1, there is provided a receiving wireless station 150, such as an AP or non-AP wireless station. The receiving wireless station 150 includes a scrambling data extractor 155, a descrambler 160, a wireless receiver 165, and potentially other components such as but not necessarily limited to an error correction decoder 152, a processor 170 and computer memory 172, or equivalent hardware.

The receiving station 150 receives (via the wireless receiver 165) the transmitted PPDU 130. The scrambling data extractor 155 is configured to interpret the portion 136 of the Scrambler Initialization Field 134 in the received header 132 as the control information 140. The scrambling data extractor 155 may operate on the received header data, for example following error correction decoding by error correction decoder 152. As mentioned above, the portion 136 corresponds to at least one bit of a Scrambler Initialization Field 134, and can correspond to part or all of the Scrambler Initialization Field 134. The scrambling data extractor 155 is further configured to interpret the (entire) contents of the Scrambler Initialization Field 134 as the scrambler initialization value 142. The scrambling data extractor 155 can pass the scrambler initialization value 142 to the descrambler 160. The descrambler 160 is configured to descramble a portion of the received PPDU 130 based on this scrambler initialization value.

It should be noted that, due to interference, noise, etc., the contents of the PPDU 130 as seen by the receiving station 150 can differ from the contents of the PPDU as provided by the transmitting station 110. In some embodiments, the control information conveyed through Scrambler Initialize Field is protected through error correction coding to mitigate the impact of interference and noise.

Components such as the scrambler initializer, the scrambler, the scrambling data extractor, the descrambler, as well as other components such as error correction encoders and decoders, can include circuitry such as integrated circuits configured to receive data, process the data, and provide the processed data in a predetermined manner, as would be readily understood by a worker skilled in the art. The components can be high-speed digital circuits such as application specific integrated circuits (ASICs). In some embodiments, the components can be implemented by a processor executing computer program instructions. The transmitter and receiver include radiofrequency components as would be readily understood by a person skilled in the art.

Figure 2A:
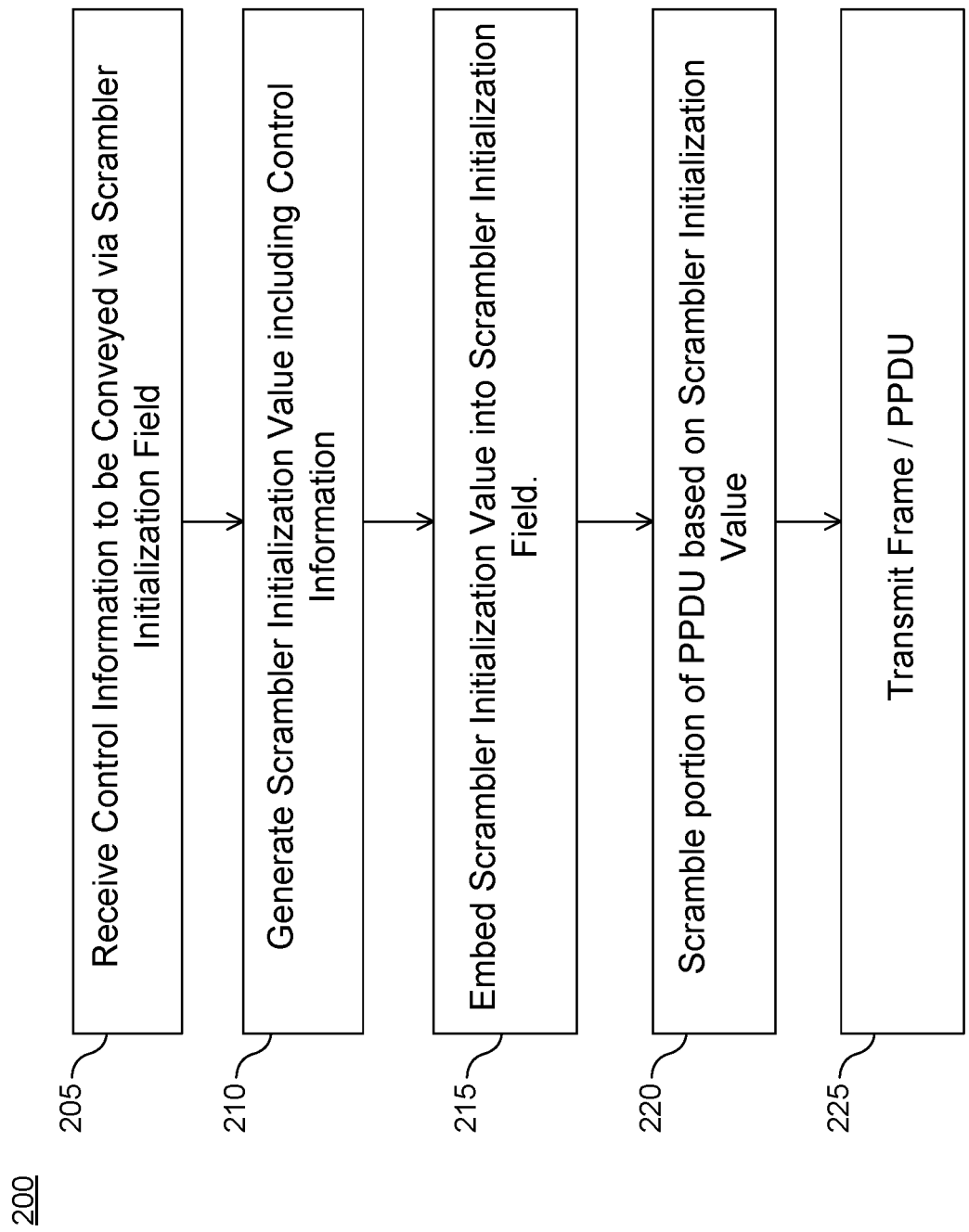
Figure 2B:
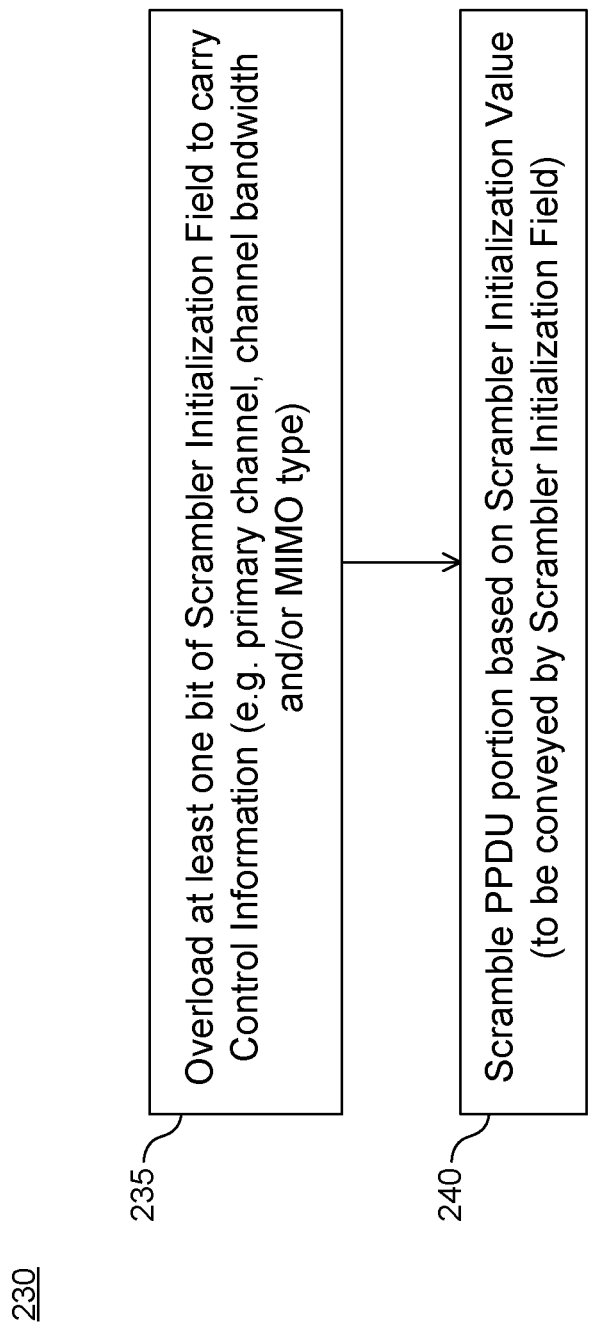

FIGS. 2A, 2B and 2C illustrate methods for frame/PPDU transmission, according to potentially overlapping embodiments of the present disclosure. FIG. 2A illustrates a method 200 for transmitting a frame/PPDU by a transmitting wireless station, according to an embodiment of the present disclosure. The method 200 includes receiving 205 control information to be conveyed in the Scrambler Initialization Field of a header of the PPDU. The method further includes generating 210 a scrambler initialization value (SIV) which includes the control information, and which may also include one or more random or pseudo-random bits. As such, one or more predetermined bit positions of the SIV are overloaded with bits which are indicative of control information. Some or all of the bits of the SIV can be overloaded with control information. The method further includes embedding 215 the SIV into the Scrambler Initialization Field located in the PPDU header. The embedding can be performed as part of the generation of the PPDU, i.e. providing a designated type of information to be transmitted by the PPDU. Generating and embedding of the SIV can be done by a scrambler initializer. The method further includes scrambling 220, using a scrambler, a portion of a PPDU associated with the frame, based on the SIV. Embedding 215 and scrambling 220 do not necessarily occur sequentially in the illustrated order. The frame (and PPDU) is subsequently transmitted 225 by the transmitting wireless station. The transmission can include various steps such as channel coding, modulation, etc.

FIG. 2B illustrates a method 230 for transmitting a PPDU by a transmitting wireless station, according to another embodiment of the present disclosure. The PPDU includes a header having a Scrambler Initialization Field. The method includes overloading 235, using a scrambler initializer, at least one bit of the Scrambler Initialization Field to carry control information. The method further includes scrambling 240, using a scrambler, a PPDU or a portion of the PPDU based on a scrambler initialization value to be conveyed by the Scrambler Initialization Field. In various embodiments, the control information indicates at least one of: a primary channel to be used by the transmitter; a channel width (i.e. bandwidth) to be used by the transmitter; and a MIMO type to be used by the transmitter.

It should be noted here that scrambling based on contents of the Scrambler Initialization Field does not necessarily require the scrambler to read the Scrambler Initialization Field in the header itself during the scrambling operation (indeed, the PPDU may not have been fully constructed prior to scrambling). Rather, the scrambler initialization value may be generated by the transmitting STA and made available both to the scrambler and for inclusion in the PPDU header. That is, scrambling is performed based on a scrambler initialization value which is (also) contained, or will be contained, in the Scrambler Initialization Field to be transmitted to the receiving station.

FIG. 2C illustrates a method 260 for indicating control features in an EDMG PPDU for wireless local area network (LAN) communications, according to another embodiment of the present disclosure. The method is implemented for example by a transmitting wireless station. The method optionally includes selecting 265 at least one transmission control setting for the wireless LAN communications. The transmission control setting can be, for example, control information such as: a primary channel to be used by the transmitter; a channel width to be used by the transmitter; and/or a MIMO type to be used for the wireless LAN communications. The method includes embedding 270 at least one selected or predetermined transmission control setting into at least one bit of a Scrambler Initialization Field of a physical layer (PHY) header. The method further includes scrambling 275 the PHY header and accompanying data based on contents of the Scrambler Initialization Field, for example by initialising a scrambler bit shift register using the at least one bit of the Scrambler Initialization Field. The method further includes error-control encoding and transmitting 280 the scrambled PHY header and accompanying data toward an intended recipient device.

Figure 3A:
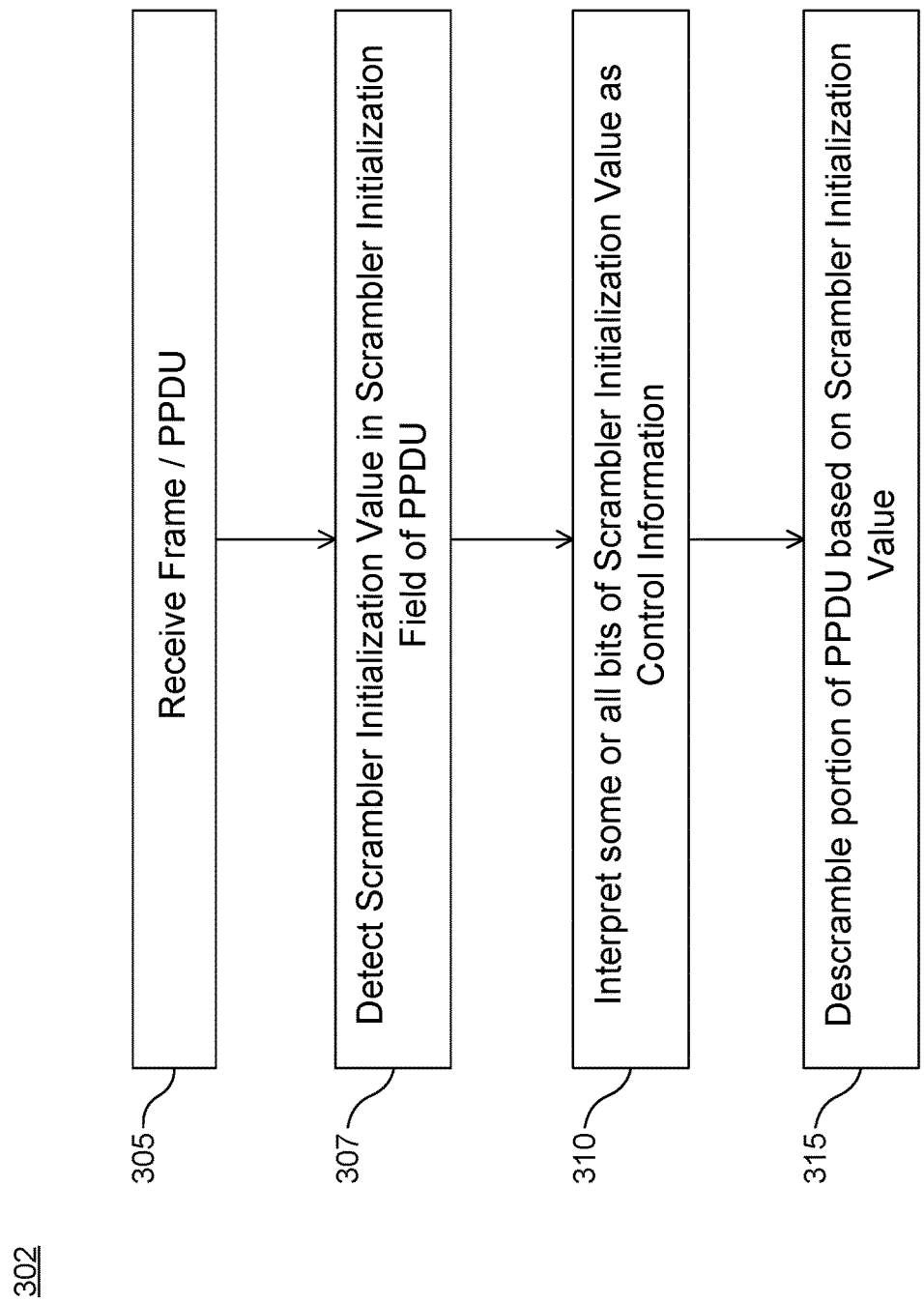
FIGS. 3A to 3C illustrate methods for receiving data according to various embodiments of the present disclosure.
Figure 3B:
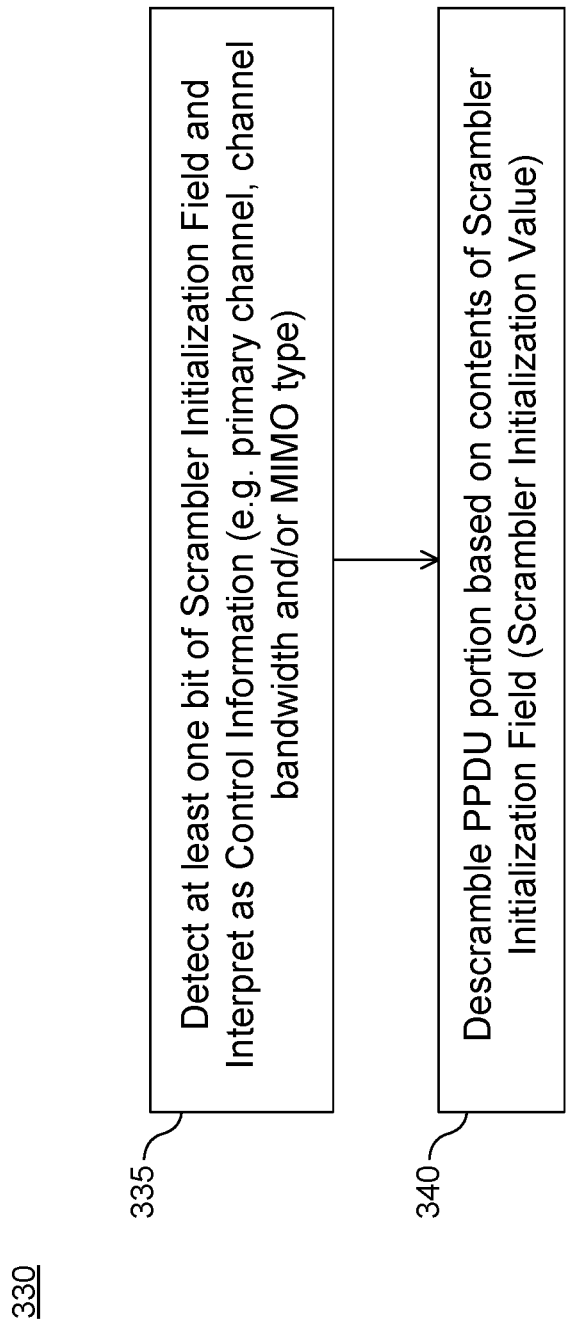
Figure 3C:
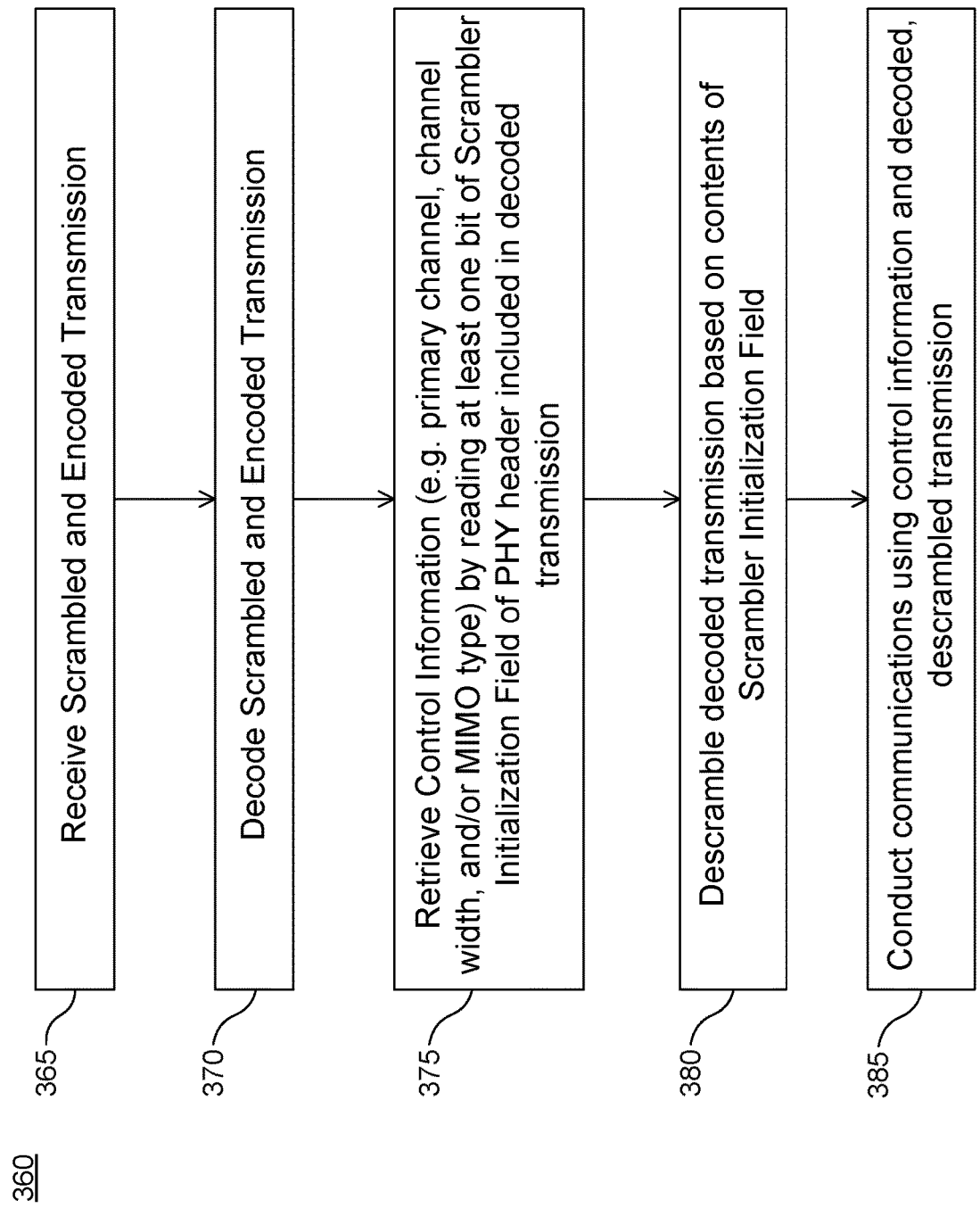

FIGS. 3A, 3B and 3C illustrate methods for frame/PPDU reception, according to potentially overlapping embodiments of the present disclosure. FIG. 3A illustrates a method 302 for receiving a PPDU by a receiving wireless station, according to an embodiment of the present disclosure. The method 302 includes, upon receipt 305 of a frame/PPDU, detecting 307 a scrambler initialization value (SIV) conveyed in a Scrambler Initialization Field corresponding to the received PPDU. The method further includes interpreting 310 some or all bits of the SIV as control information, according to a predetermined interpretation mapping certain bits of the SIV to certain predetermined types of control information, such as an indication of primary channel, channel bandwidth and/or MIMO type. The detecting 307 and the interpreting 310 can be performed by a scrambling data extractor. The method further includes descrambling 315, using a descrambler, a portion of the received PPDU based on the SIV. The interpreting 310 and descrambling 315 are not necessarily performed sequentially in the illustrated order.

FIG. 3B illustrates a method 330 for receiving a frame/PPDU by a receiving wireless station, according to another embodiment of the present disclosure. The frame includes a header having a Scrambler Initialization Field. The method includes detecting 335 at least one bit of the Scrambler Initialization Field, and interpreting the at least one bit as control information. The method further includes descrambling 340 at least a portion of the PPDU based on contents of the Scrambler Initialization Field (i.e. based on the scrambler initialization value contained therein). In various embodiments, the control information indicates at least one of: a primary channel to be used by the transmitter; a channel width (bandwidth) to be used by the transmitter; and a MIMO type to be used by the transmitter.

FIG. 3C illustrates a method 360 for indicating control features in an EDMG frame for wireless LAN communications, according to another embodiment of the present disclosure. The method is implemented for example by a receiving wireless station, such as an intended recipient of an EMDG frame. The method includes receiving 365 a scrambled and encoded (e.g. channel encoded) transmission. The method further includes decoding 370 the scrambled and encoded transmission. The method further includes retrieving 375 control information by reading at least one bit of a Scrambler Initialization Field of a PHY header included in the decoded transmission. The retrieved control information may correspond to at least one control feature in an EDMG wireless LAN communication. The received control information may be a primary channel; a channel width; and/or a MIMO type. The method further includes descrambling 380 the decoded transmission based on contents of the Scrambler Initialization Field, for example by initialising a descrambler bit shift register using at least one bit of the Scrambler Initialization Field. The method further includes conducting 385 the wireless LAN communications using the control information and the decoded, descrambled transmission.

Figure 4:
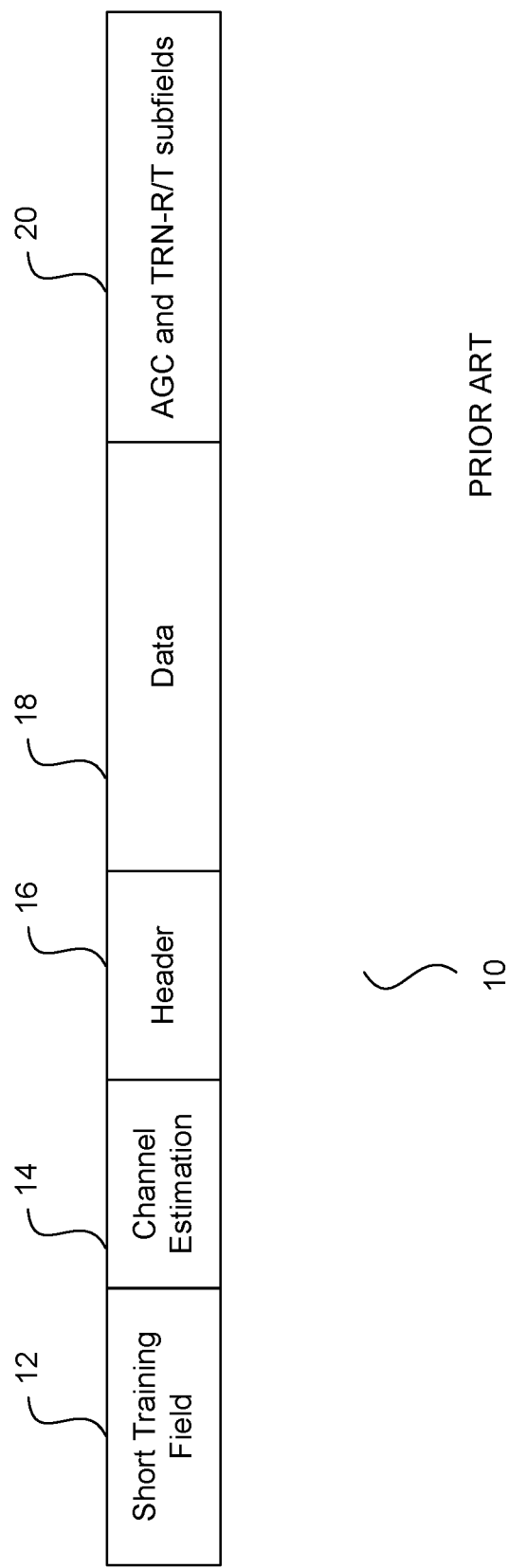
FIG. 4 illustrates a conventional 802.11ad frame format for wireless communications.

The present disclosure relates to an apparatus, system, and method for communicating between wireless stations (STAs), including AP and Non-AP Stations. Referring to FIG. 4, an example prior art frame format is presented. The example prior art frame format is the format used in 802.11ad, for example as described in Section 21 of the IEEE Computer Society document entitled "IEEE Standard for Information technology-Telecommunication and information exchange between systems; Local and metropolitan area networks—Specific requirements, Part 11: Wireless LAN medium Access Control (MAC) and Physical Layer (PHY) Specifications, Amendment 3: Enhancements for Very High Throughput in the 60 GHz Band," IEEE Std. 802.11ad-2012, Dec. 28, 2012 (referred to herein as 802.11ad). In FIG. 4, a PPDU 10 consists of five fields: a Short Training Field (STF) 12, a Channel Estimation (CE) Field 14, a Header Field 16, a Data Field 18, and Automatic Gain Control (AGC) and Receive/Transmit Training (TRN-R/T) Fields 20. As will be appreciated, the frames and fields illustrated in the Figures of this disclosure have been formatted for clarity and are not to scale indicative of a size of each field. In some cases, the fields are sized based upon a length of the reference text, and accordingly are not representative of the number of bits contained within each field. Note, in some literature the STF 12, CE Field 14, and Header Field 16 may be pre-fixed with a capital "L" to indicate that these are "Legacy" defined fields (e.g. L-Header). For simplicity and clarity the applicant has not adopted this nomenclature in this disclosure.

The STF 12 is used for synchronization and differentiation of the Control PHY and the non-Control PHY. The CE Field 14 is used for channel estimation. Optionally, the CE Field 14 may be used for differentiation of single carrier (SC) PHY and OFDM PHY. The Header Field 16 consists of or comprises several fields that define the details of the Physical Layer Protocol Data Unit (PPDU) to be transmitted. The Data Field 18 consists of or comprises the payload data of the Physical Layer Service Data Unit (PSDU) that is to be scrambled, encoded, and modulated. The AGC and TRN-R/T subfields 20 are used for beam refinement and beam tracking.

Figures 5A, 5B, 5C:
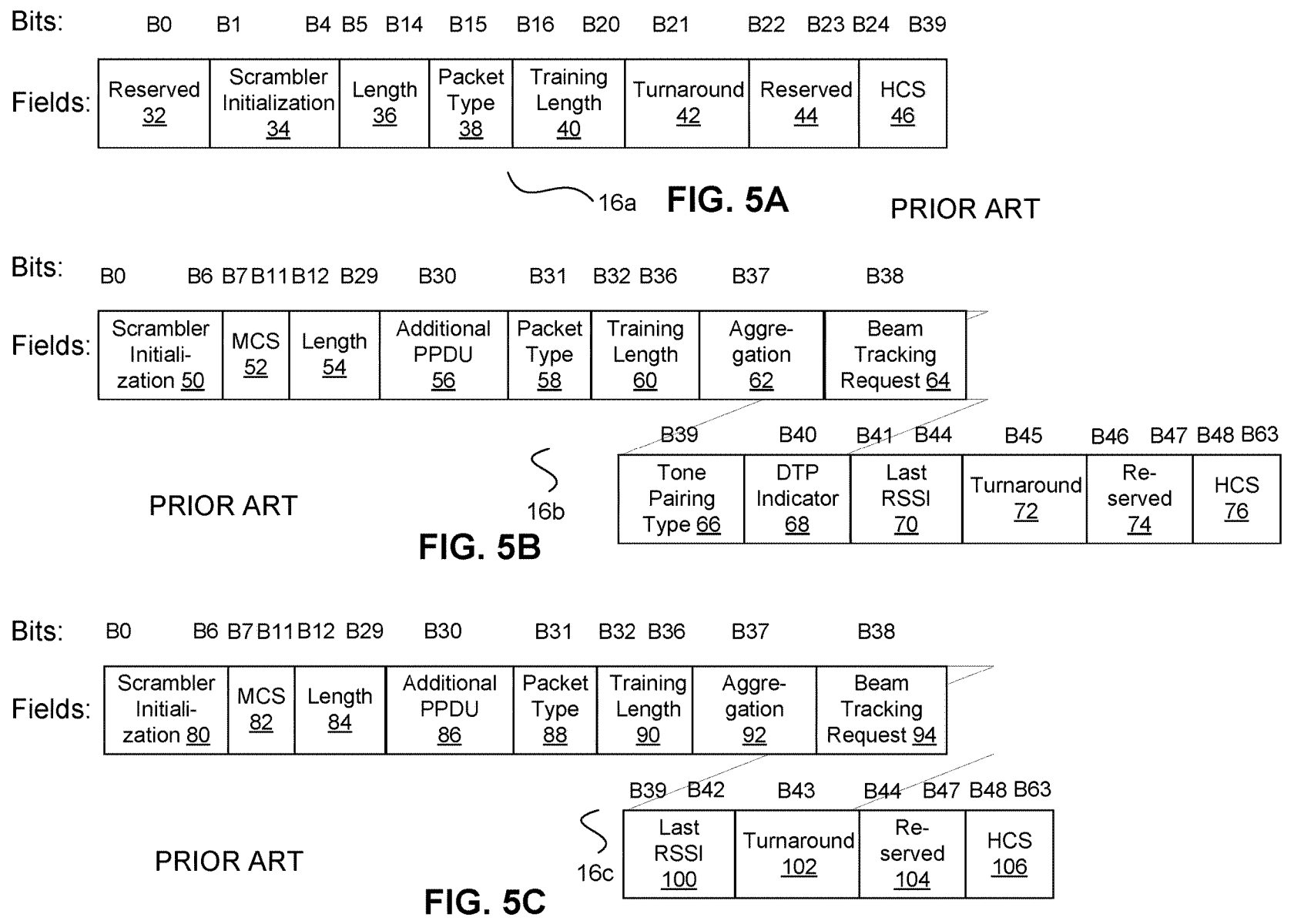

The actual makeup of the Header Field 16 varies depending upon the specific transmission modality. For instance, three examples of Header Fields 16 are those used for Control PHY, OFDM PHY, and SC PHY. Header Fields for Control PHY, OFDM PHY, and SC PHY refer, respectively, to the fields which include information used during transmission in order for the receiver to conduct correct reception of a Control PHY PPDU, OFDM PHY PPDU, and SC PHY PPDU. Referring to FIG. 5A, a Header Field 16a for Control PHY is illustrated. Further related details can be found for example in Section 21.4 of 802.11ad. As illustrated, the Control PHY Header Field 16a includes a 1 bit Reserved Field 32, a 4 bit Scrambler Initialization Field 34, a 10 bit Length Field 36, a 1 bit Packet Type Field 38, a 5 bit Training Length Field 40, a 1 bit Turnaround Field 42, a 2 bit Reserved Field 44, and a 16 bit Header Check Sequence (HCS) Field 46.

Referring to FIG. 5B, a Header Field 16b for OFDM PHY is illustrated. Further related details can be found for example in Section 21.5 of 802.11ad. As illustrated, the OFDM PHY Header Field 16b includes a 7 bit Scrambler Initialization Field 50, a 5 bit Modulation and Coding Scheme (MCS) Field 52, an 18 bit Length Field 54, a 1 bit Additional PPDU field 56, a 1 bit Packet Type Field 58, a 5 bit Training Length Field 60, a 1 bit Aggregation Field 62, a 1 bit Beam Tracking Request Field 64, a 1 bit Tone Pairing Type Field 66, a 1 bit Dynamic Tone Pairing (DTP) Indicator Field 68, a 4 bit Last Received Signal Strength Indicator (RSSI) Field 70, a 1 bit Turnaround Field 72, a 2 bit Reserved Field 74, and a 16 bit Header Check Sequence (HCS) Field 76.

Referring to FIG. 5C, a Header Field 16c for Single Carrier PHY is illustrated. Further related details can be found for example in Section 21.6 of 802.11ad. As illustrated, the Single Carrier PHY Header Field 16c includes a 7 bit Scrambler Initialization Field 80, a 5 bit Modulation and Coding Scheme (MCS) Field 82, an 18 bit Length Field 84, a 1 bit Additional PPDU field 86, a 1 bit Packet Type Field 88, a 5 bit Training Length Field 90, a 1 bit Aggregation Field 92, a 1 bit Beam Tracking Request Field 94, a 4 bit Last Received Signal Strength Indicator (RSSI) Field 100, a 1 bit Turnaround Field 102, a 4 bit Reserved Field 104, and a 16 bit Header Check Sequence (HCS) Field 106.

In preparation for transmission, the transmitting device performs a scrambling operation on all of the bits in the PPDU following the Scrambler Initialization Field in the header except for those in AGC and TRN-R/T fields 20, using a scrambler initialization value obtained from the Scrambler Initialization Field. The scrambling operation reorders the bits or updates the bit patterns of the header and data fields to whiten the data stream, that is to make it appear random from the transmitter's perspective. Referring to FIG. 5A, all bits after bit B4 would be scrambled based upon scrambler initialization bits, i.e. bits x1, x2, x3, x4 of the scrambler shift register initialized using the Scrambler Initialization Field 34 bits B1 to B4, i.e. bits B1 to B4 of the Header Field 16a and bits x5, x6, x7 set to '1'. Referring to FIGS. 5B and 5C, all bits after bit B6 would be scrambled based upon the values contained in the Scrambler Initialization Field 50, 80 bits B0 to B6, i.e. bits B0 to B6 of the Header Field 16b or 16c. Header Field bits are numbered for reference, beginning with "B0" and proceeding sequentially.

A common technique for whitening data by scrambling is to feed the data through a pseudorandom number generator that employs a seed value. In the case of 802.11ad PHY (for example as described in Section 21 of 802.11ad), for instance, the scrambler has been selected to use the operation of XORing each bit in turn with a length 127 periodic sequence generated by the polynomial $S(x)=x^7+x^4+1$ for a given scrambler initialization state. The PLCP header bits, with the exception of the first seven bits for the SC and OFDM cases illustrated in FIGS. 5B and 5C and the first five bits for the control PHY case illustrated in FIG. 5A, are placed one after the other. For the cases illustrated in FIGS. 5B and 5C, bit B7 is placed first. For the case illustrated in FIG. 5A, bit B5 is placed first. The octets of the PSDU and the padding bits are placed into a bit stream with bit 0 (the least significant bit (LSB)) of each octet being placed first and bit 7 of each octet (the most significant bit (MSB)) being placed last.

For each PPDU, the transmitter selects a nonzero seed value for the scrambler (bits $x_1$ through $x_4$ for the Control PHY case illustrated in FIG. 5A; bits $x_1$ through $x_7$ for the SC PHY and OFDM PHY cases illustrated in FIGS. 5B and 5C). The 802.11ad standard proposes that the seed value is selected in a pseudo random fashion. The seed value is entered in the Scrambler Initialization Field 34, 50, and 80 of the PLCP header 16a, 16b, and 16c respectively. Each data bit in the Data Field 18 of the PPDU is then XORed with the scrambler output ($x_4$ XOR $x_7$) and the scrambler content is shifted once.

Figure 6:
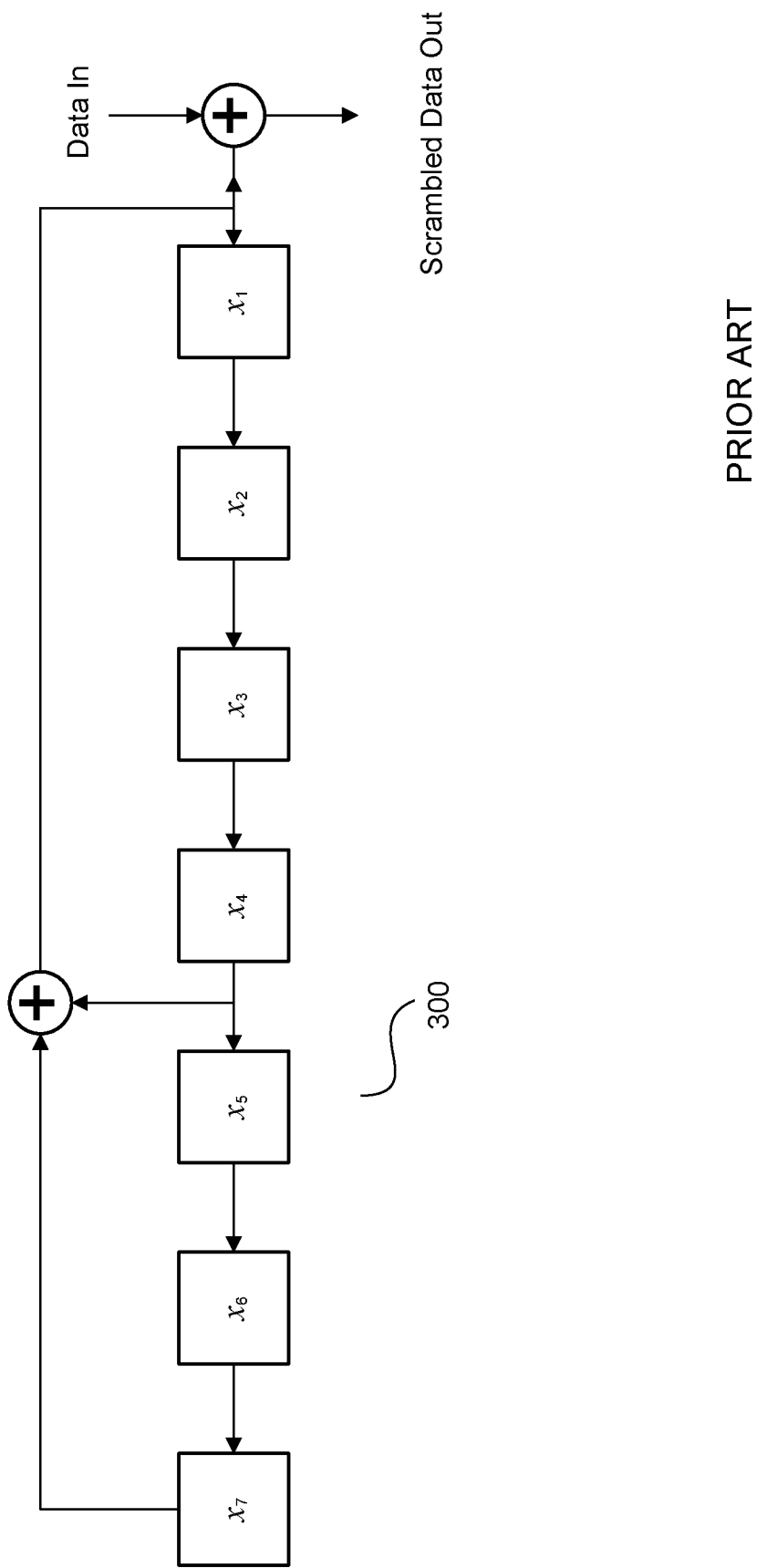
FIG. 6 is a block diagram illustrating a scrambling process.

The operation is diagrammatically illustrated in FIG. 6, for an embodiment in which a shift register is used for implementation. Within the context of the Control PHY case (see FIG. 5A), the scrambling operation is defined based upon the 4 bit Scrambler Initialization Field 34. In this case the scrambler shift register 300 is initialised by inserting bit values from bits B1, B2, B3, and B4 of the 4 bit Scrambler Initialization Field 34 (and also of the PLCP header 16a) into bits $x_1$, $x_2$, $x_3$, and $x_4$ of the scrambler shift register 300 illustrated in FIG. 6, and by setting bits $x_5$, $x_6$, and $x_7$ to '1'. The scrambling operation can then proceed by inputting header bits starting from bit B5, and continuing for the remainder of the header 16a and after the last bit B39 has been input, continuing by bits from the Data Field 18 until all bits have been processed, or another appropriate stopping condition has been reached.

Within the context of the OFDM PHY and SC PHY cases (see FIGS. 5B and 5C, respectively), the scrambling operation is defined based upon the 7 bit Scrambler Initialization Field 50, 80. In this case the scrambler shift register 300 is initialised by inserting bit values from bits B0, B1, B2, B3, B4, B5, and B6 of the 7 bit Scrambler Initialization Field 50, 80 (and also of the PLCP header field 16b or 16c) into bits $x_1$, $x_2$, $x_3$, $x_4$, $x_5$, $x_6$, and $x_7$ of the scrambler shift register 300 illustrated in FIG. 6. The scrambling operation can then proceed by inputting header bits starting from bit B7, and continuing for the remainder of the header 16a and after the last bit B63 has been input, continuing by bits from the Data Field 18 until all bits have been processed, or another appropriate stopping condition has been reached.

The proposed IEEE 802.11ay standard (in its current form) includes the feature that an EDMG STA is able to determine the primary channel and occupied bandwidth of any EDMG PPDU that it receives. In order to enable backward compatibility with legacy STAs, the Header of each EDMG PPDU can be decoded by a legacy STA to detect the length and MCS in the Header. Within this constraint, however, the EDMG STA frame may also need to include the additional signaling required to support EDMG features (e.g. channel bonding, & MIMO). This introduces limitations in that there are not enough reserved bits in the Control header to accommodate this additional signaling, and there are not enough reserved bits in Request to Send (RTS), DMG Clear to Send (CTS) for bandwidth signaling.

As such, a technical problem with the prior art is recognized herein, in which it is difficult to efficiently include all necessary data into an applicable IEEE 802.11ay-compatible frame while retaining backward-compatibility of the data frame. The difficulty is due in part to the limited number of bits in the frame header relative to the number of bits needed to convey all desired header information. Embodiments of the present disclosure are intended to address such a problem. In particular, as mentioned above, embodiments of the present disclosure relate to use of certain bits (e.g. bits of the Scrambler Initialization Field) of a transmitted message (e.g. an IEEE 802.11 frame) to convey data that is used both for scrambling/descrambling operations as well as for one or more other purposes.

Figure 7A:
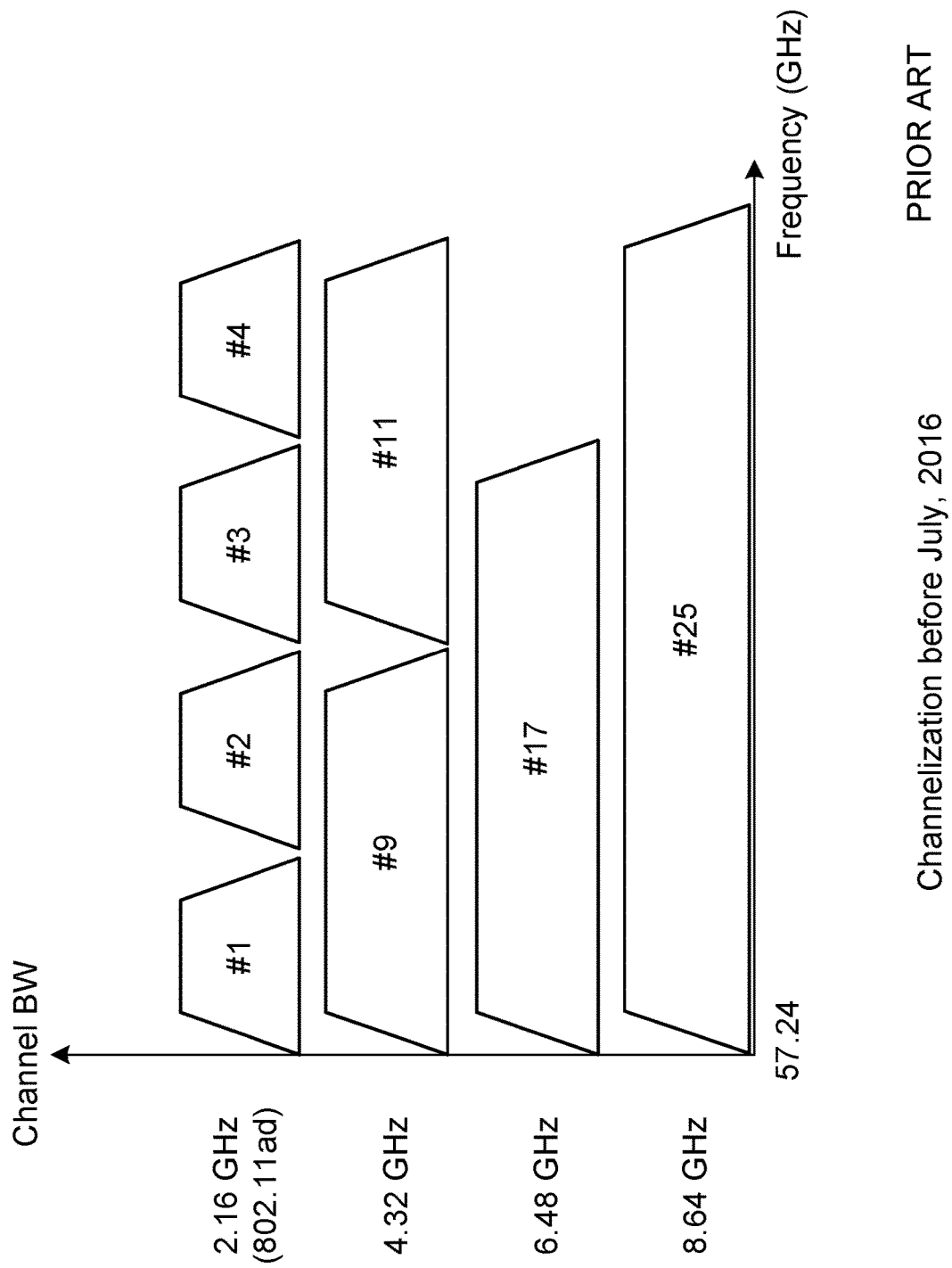
FIG. 7A illustrates prior art channelization used by EDMG STAs.
Figure 7B:
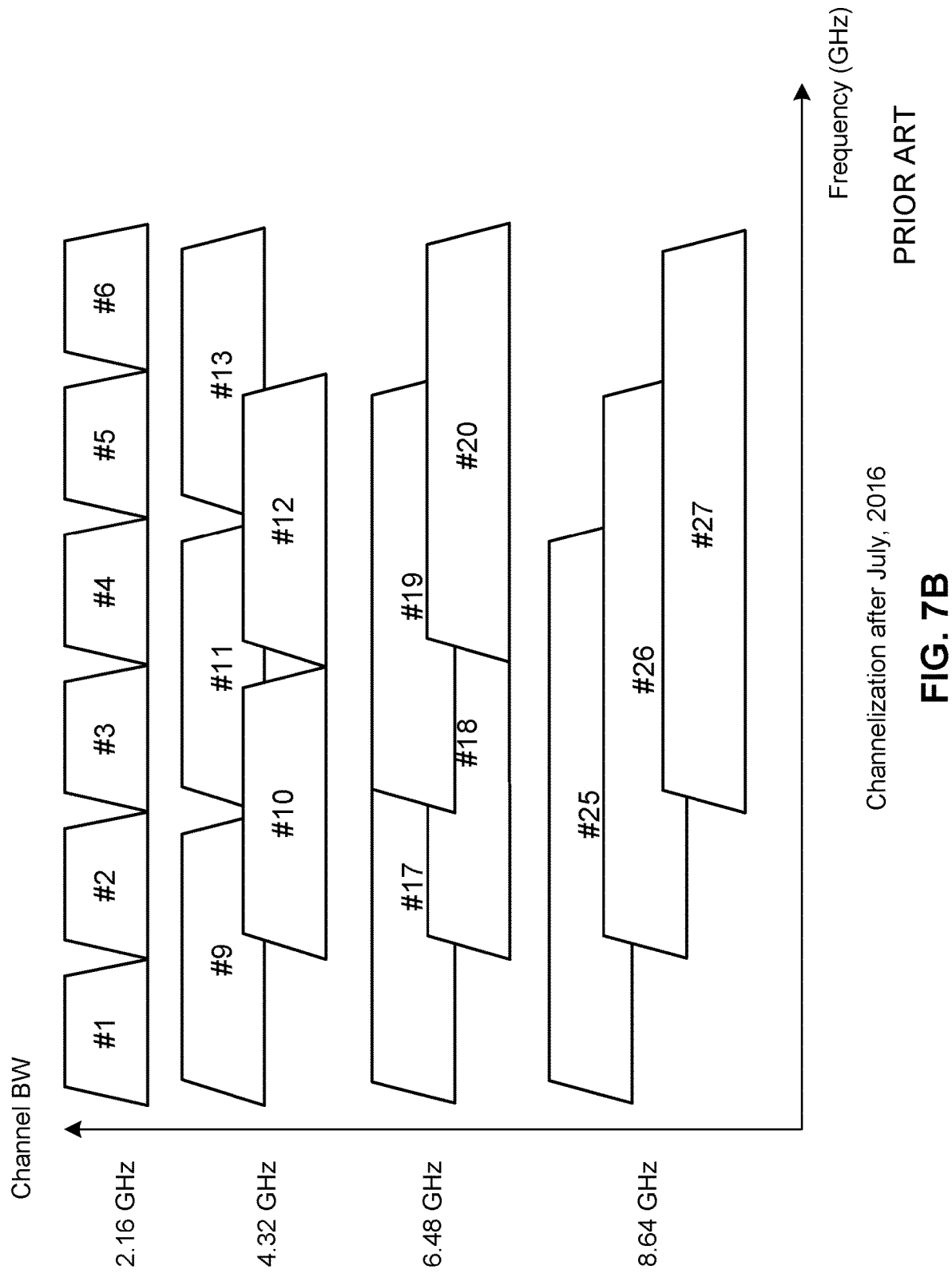
FIG. 7B illustrates prior art channelization used by EDMG STAs.

Referring to FIGS. 7a and 7b, the prior art channelization used by EDMG STAs is illustrated (IEEE 802.11/15-1358-09-00ay-specification-framework-for-tgay). The ability of a particular device to use a channel also depends upon local regulatory rules, and any additional rules prescribed by the 802.11ay standard. The channelization illustrated in FIG. 7b, will be referred to below in the following examples.

Figure 8:
FIG. 8 illustrates a proposed 802.11ay PPDU.

Referring to FIG. 8, the EDMG PLCP (Physical Layer Convergence Protocol) protocol data unit (PPDU) 400 currently proposed in 802.11ay is illustrated for reference. In the context of the EDMG PPDU 400, the L-Header 406 is the equivalent of the Header Field 16.

In the case of the 802.11ac [5, Sec 17.3.5.5], the scrambling operation is used within the context of the Data field. In the scrambling operation in Data field, the Service field in DATA field is composed of 16 bits including 7 Scrambler Initialization bits and 9 Reserved SERVICE bits all of which are set to '0's. When the channel bandwidth in non-HT is not present, the scrambler initial state is set with pseudo random non-zero value. When the channel bandwidth in non-HT is present, the scrambler is initialized with Scrambling Sequence B0 through B6. If the channel bandwidth in non-HT equals CBW20, bits B0 through B4 will be set to a nonzero pseudo random value, while bits B5, B6 indicate the channel bandwidth. Bits B0 through B3 will be set to 4-bit pseudorandom nonzero integer if the channel bandwidth in non-HT equals CBW20 and the dynamic bandwidth in non-HT equals Static, and will be a 4-bit pseudorandom integer otherwise.

The currently proposed method for the IEEE 802.11ay standard includes a fixed 18-byte information length Control Trailer Field included before the Data Field 18 (see, for instance IEEE 802.11-16/0105r0, "Adding control trailer to control mode PPDUs"). A reserved bit in the Header Field 16 may be allocated to indicate the presence of the Control Trailer. Due to the overhead cost though, it is desirable to avoid use of the Control Trailer when control information is indicated by few bits.

Embodiments of the present disclosure involve overloading at least one bit in the Scrambler Initialization Field 34, 50, 80 to carry control information, instead of being set in pseudorandom fashion. In an aspect, the control information may identify the primary channel. In an aspect, the control information may identify the channel bandwidth. In an aspect, the control information may indicate a MIMO type. In an aspect, the control information may comprise a combination of two or more of the primary channel identity, the channel bandwidth, and the MIMO type. In an aspect, at least one bit in the Scrambler Initialization Field 34, 50, 80 is overloaded to carry control information and at least one other bit in the Scrambler Initialization Field 34, 50, 80 is set randomly, or pseudorandomly.

Several example embodiments of the present disclosure will now be described. It should be appreciated that these example embodiments can be varied or combined in a variety of ways. For example, the bits used to convey control information, and the mapping between bit values and control information (such as channel bandwidth and/or static/dynamic bandwidth modes), can be varied. Mappings between bit values and control information are known a priori to both transmitting and receiving stations, so that control information can be signaled between the two stations.

Example 1—Control PHY: Primary Channel/Channel Bandwidth

As illustrated in FIG. 9, an example Control PHY may be constructed to indicate each of the primary channel and the channel bandwidth by overloading the Scrambler Initialization Field 34 in the Header Field 16*a* for a Control PHY PPDU. In Example 1, we assume there are five options for the primary channel: i) the channel transmitting the PPDU; ii) channel #1; iii) channel #2; iv) channel #3; and, v) channel #4. We also assume that there are 4 available bandwidth options: a) 2.16 GHz; b) 4.32 GHz; c) 6.48 GHz; and, d) 8.64 GHz.

Bits B1, B2, B3, and B4 of the Scrambler Initialization Field 34 (and of the Header Field 16*a*) are overloaded to include the values listed in the table illustrated in FIG. 9 that correspond to the primary channel, the channel bandwidth and the channel number corresponding to FIG. 7A selected for that PPDU. That is, bits B1 to B4 of the Scrambler Initialization Field 34 are set to the value which corresponds, according to the table illustrated in FIG. 9, to the desired channel and bandwidth selections. In the scrambling operation, bits B1, B2, B3, and B4 are entered into bits $x_1$, $x_2$, $x_3$, and $x_4$ of the scrambler shift register 300 in place of pseudorandom digits, and bits $x_5$, $x_6$, and $x_7$ are each set to '1' as was the previous case, i.e. as described with respect to FIG. 6. The right-most column in FIG. 9 indicates a channel number as defined in FIG. 7A.

Example 2—Control PHY: Static/Dynamic Bandwidth Operation in 802.11ay

As illustrated in FIG. 10, an example Control PHY may be constructed to indicate each of the static/dynamic channel bandwidth setting and the channel bandwidth by overloading the Scrambler Initialization Field 34 in the Header Field 16*a* for a Control PHY EDMG PPDU. In Example 2, bit B3 is used to indicate whether the channel bandwidth setting is static or dynamic. Bits B1 and B2 are used to indicate the selected channel bandwidth, based on the assumption that there are 4 available bandwidth options: a) 2.16 GHz; b) 4.32 GHz; c) 6.48 GHz; and, d) 8.64 GHz.

In the case where the channel bandwidth setting is dynamic, the channel bandwidth can expand to include available channels. For instance, if two 2.16 GHz channels are free, then one can transmit over 4.32 GHz; if three 2.16 GHz channels are free, then one can transmit over 6.48 GHz, and if four 2.16 GHz channels are free, one can transmit over 8.64 GHz. In the dynamic channel bandwidth setting, the bandwidth can automatically vary between 2.16 GHz and a specified maximum channel bandwidth, inclusive. The bandwidth is restricted to multiples of 2.16 GHz. The maximum channel bandwidth is set by bits B1 and B2, according to the rightmost two columns in FIG. 10.

In the case where the channel bandwidth setting is static, then the bandwidth may be set to one of 4.32 GHz, 6.48 GHz, or 8.64 GHz. If a secondary 2.16 GHz channel within the wideband channel is not available, then the transmitter can restart the transmit procedure over the primary channel. In the static channel bandwidth setting, the bandwidth is fixed at the specified value and does not vary with availability.

The channel bandwidth may be indicated by selecting one of the available bandwidths (e.g. for this case 2.16 GHz, 4.32 GHz, 6.48 GHz, or 8.64 GHz).

Bits B1, B2, and B3 of the Scrambler Initialization Field 34 are overloaded to include the values listed in the table illustrated in FIG. 10 that correspond to the static/dynamic channel bandwidth setting and the channel bandwidth selected for that PPDU. In the scrambling operation, bits B1, B2, and B3 are entered into bits $x_1$, $x_2$, and $x_3$ of the scrambler shift register 300 in place of pseudorandom digits, bit B4 is selected pseudorandomly and entered into bit $x_4$ of the scrambler shift register 300, and scrambler bits $x_5$, $x_6$, and $x_7$ are each set to '1' as was the previous case.

In other words, in Example 2, bits B1 and B2 of the Scrambler Initialization Field are set and/or interpreted according to the table illustrated in FIG. 10 to convey that the channel bandwidth is a multiple of 2.16 GHz lying between 2.16 GHz and 8.64 GHz, inclusive. When the channel bandwidth as indicated by bits B1 and B2 is 4.32 GHz or greater, bit B3 of the Scrambler Initialization field is set and/or interpreted according to the table illustrated in FIG. 10 to convey that the channel bandwidth setting is static (when B3='0') or dynamic (when B3='1'). When the channel bandwidth as indicated by bits B1 and B2 is 2.16 GHz, the issue of whether channel bandwidth is static or dynamic is not relevant because both settings result in identical behavior. In this case, the value of bit B3 can be set to '1' or '0' arbitrarily, for example randomly or pseudo-randomly. Such random or pseudo-random setting of B3 can improve the "whiteness" of scrambling, because B3 is also part of the Scrambler Initialization Field.

Example 3—SC PHY and OFDM PHY: Primary Channel/Channel Bandwidth

As illustrated in FIG. 11, an example SC PHY and OFDM PHY format may be constructed to indicate each of the primary channel and the channel bandwidth by overloading the Scrambler Initialization Field 50, 80 in the Header Field 16b, 16c for a SC PHY/OFDM PHY EDMG PPDU. In Example 3, we assume there are four options for the primary channel: i) channel #1; ii) channel #2; iii) channel #3; and, iv) channel #4. We also assume that there are 4 available bandwidth options: a) 2.16 GHz; b) 4.32 GHz; c) 6.48 GHz; and, d) 8.64 GHz.

Bits B0, B1, B2, and B3 of the Scrambler Initialization Field 50, 80 (and thus of the Header Field 16b or 16c) are overloaded to include the values listed in the table illustrated in FIG. 11, which correspond to the primary channel and channel bandwidth selected for that PPDU. That is, bits B0 to B3 of the Scrambler Initialization Field 50, 80 are set to the value which corresponds, according to the table illustrated in FIG. 11, to the desired channel and bandwidth selections. In the scrambling operation, bits B0, B1, B2, and B3 are entered into bits $x_1$, $x_2$, $x_3$, and $x_4$ of the scrambler shift register 300 in place of pseudorandom digits, and scrambler bits $x_5$, $x_6$, and $x_7$ may each be set pseudorandomly as was the previous case, i.e. as described with respect to FIG. 6. The right-most column in FIG. 11 indicates a channel number as defined in FIG. 7A.

Example 4 SC PHY and OFDM PHY: Static/Dynamic Bandwidth Operation in 802.11ay As illustrated in FIG. 12, example SC PHY and OFDM PHY formats may be constructed to indicate each of the static/dynamic channel bandwidth setting and the channel bandwidth by overloading the Scrambler Initialization Field 50 in the Header Field 16b for an OFDM PHY EDMG PPDU and the Scrambler Initialization Field 80 in the Header Field 16c for an SC PHY EDMG PPDU. In Example 4, bit B2 is used to indicate whether the channel bandwidth setting is static or dynamic. Bits B0 and B1 are used to indicate the selected channel bandwidth, based on the assumption that there are 4 available bandwidth options: a) 2.16 GHz; b) 4.32 GHz; c) 6.48 GHz; and, d) 8.64 GHz.

In the case where the channel bandwidth setting is dynamic, then the channel bandwidth can expand to include available channels. For instance, if two 2.16 GHz channels are free, then one can transmit over 4.32 GHz; if three 2.16 GHz channels are free, then one can transmit over 6.48 GHz, and if four 2.16 GHz channels are free, one can transmit over 8.64 GHz. In the dynamic channel bandwidth setting, the bandwidth can automatically vary between 2.16 GHz and a specified maximum channel bandwidth, inclusive. The bandwidth is restricted to multiples of 2.16 GHz. The maximum channel bandwidth is set by bits B0 and B1, according to the rightmost two columns in FIG. 12.

In the case where the channel bandwidth setting is static, then the bandwidth may be set to one of 4.32 GHz, 6.48 GHz, or 8.64 GHz. If a secondary 2.16 GHz channel within the wideband channel is not available, then the transmitter can restart the transmit procedure over the primary channel. In the static channel bandwidth setting, the bandwidth is fixed at the specified value and does not vary with availability.

The channel bandwidth may be indicated by selecting one of the available bandwidths (e.g. for this case 2.16 GHz, 4.32 GHz, 6.48 GHz, or 8.64 GHz).

Bits B0, B1, and B2 of the Scrambler Initialization Field 50 and 80 are overloaded to include the values listed in the table illustrated in FIG. 12 that correspond to the static/dynamic channel bandwidth setting and the channel bandwidth selected for that PPDU. In the scrambling operation, bits B0, B1, and B2 are entered into bits $x_1$, $x_2$, and $x_3$ of the scrambler shift register 300 in place of pseudorandom digits, bit B3 through B6 are selected pseudorandomly and entered into bit $x_4$ through $x_7$ of the scrambler shift register 300. Further, generally this example can limit the control features to be applied to Control frames, as well as be applicable to EDMG SC and EDMG OFDM frames.

In other words, in Example 4, bits B1 and B0 of the Scrambler Initialization Field are set and/or interpreted according to the table illustrated in FIG. 12 to convey that the channel bandwidth is a multiple of 2.16 GHz lying between 2.16 GHz and 8.64 GHz, inclusive. When the channel bandwidth as indicated by bits B1 and B0 is 4.32 GHz or greater, bit B2 of the Scrambler Initialization field is set and/or interpreted according to the table illustrated in FIG. 12 to convey that the channel bandwidth setting is static (when B2='0') or dynamic (when B2='1'). When the channel bandwidth as indicated by bits B1 and B0 is 2.16 GHz, the issue of whether channel bandwidth is static or dynamic is not relevant because both settings result in identical behavior. In this case, the value of bit B2 can be set to '1' or '0' arbitrarily, for example randomly or pseudo-randomly. Such random or pseudo-random setting of B2 can improve the "whiteness" of scrambling, because B2 is also part of the Scrambler Initialization Field.

Example 5—SC PHY and OFDM PHY: MIMO & Transmit Diversity

In addition or as an alternative to providing information about the channel bandwidth and/or the channels used, the Scrambler Initialization Field 50, 80 may be used to convey other control information. In this case, the other control information comprises a MIMO setting, or a Transmit Diversity setting. Because Examples 3, 4 utilized bits B0, B1, B2, (and also B3 in the case of Example 3) of the Scrambler Initialization Field 50, 80 for illustration purposes, Example 5 encodes the other control information into bits B4 and B5 to illustrate an example where the Primary Channel, Channel Bandwidth, and either MIMO or Transmit Diversity may be indicated within the Scrambler Initialization Field 50, 80 at the same time. Thus, in some embodiments, Example 5 is implemented concurrently with Example 3 or 4. It will be appreciated that the specific bits and bit order provided in these examples are for illustration purposes, and that other combinations and orders are also contemplated. Furthermore, control information such as a MIMO setting or Transmit Diversity setting can be indicated by bit overloading without necessarily also indicating a Primary Channel and/or Channel Bandwidth setting.

As illustrated in FIG. 13, in the case of MIMO, for instance, bits B4 and B5 (of the Scrambler Initialization Field 50 or 80, and thus also of the Header Field 16b or 16c) may be used to indicate the desired MIMO setting, while bit B6 (which follows bit B5) may be selected arbitrarily, for example pseudorandomly or to convey other control information. A mapping between bits B4 and B5 and MIMO settings is shown in FIG. 13. Bits B0, B1, B2, and B3 may either be selected pseudorandomly, or may be used to convey other control information. The bits of the overloaded Scrambler Initialization Field 50, 80 may then be used to initialise the scrambler shift register as described above.

As such, by setting the value of bits B4 and B5 appropriately, an indication can be conveyed of a MIMO setting (or lack thereof) to be used. Illustrated indications include an indication of Single Input Single Output (SISO) operation, and indications of 2×2, 3×3 and 4×4 MIMO operation. An N×N MIMO operation refers to operation in which N transmit antennas and N receive antennas are utilized, as would be readily understood by a worker skilled in the art. SISO operation refers to operation with 1 transmit antenna and 1 receive antenna.

FIG. 14 illustrates an alternative mapping between bits B4 and B5 of the Scrambler Initialization Field 50 or 80 (and thus also of the Header Field 16b or 16c) and corresponding MIMO transmit diversity setting control information. By setting the value of bits B4 and B5 appropriately, an indication can be conveyed of a type of transmit diversity (or lack thereof) to be used. Illustrated indications include an indication of SISO operation, an indication of 2×1 transmit diversity operation, and an indication of 4×1 transmit diversity operation. An N×1 transmit diversity operation refers to operation in which N transmit antennas and 1 receive antenna are utilized, as would be readily understood by a worker skilled in the art.

As illustrated in FIG. 14, in the case of transmit diversity, for instance, bits B4 and B5 may be used to indicate the transmit diversity setting, while bit B6 may be selected arbitrarily, for example pseudo-randomly or to convey other control information. Bits B0, B1, B2, and B3 may either be selected pseudo-randomly, or may be used to convey other control information. The bits of the overloaded Scrambler Initialization Field 50, 80 may then be used to initialize the scrambler shift register as described above. Further, generally this example can limit the control features to be applied to Control frames, as well as be applicable to EDMG SC and EDMG OFDM frames.

In some embodiments, whether a mapping between bits is interpreted as indicating a MIMO setting (e.g. as in FIG. 13) or a transmit diversity setting (e.g. as in FIG. 14) can depend on an operating context known to the transmitter and receiver stations. The operating context can be known a priori or communicated between transmitter and receiver stations, for example using another overloaded bit of the Scrambler Initialization Field.

Example 6—Channel Bandwidth Indication in Control PHY Header

Referring to FIG. 15, an example definition of channel bandwidth indication in a Control PHY Header is shown, in accordance with an embodiment of the present invention. In the illustrated definition, the Scrambler Initialization Field is used with a control mode PPDU. The example Scrambler Initialization Field of FIG. 15 has reserved bits 22 and 23 of the L-Header field being both set to '1'. FIG. 8 illustrates the L-Header field 406. That is, the bits B22 and B23 of the Control PHY Header field 16a illustrated in FIG. 5A (and corresponding to the Reserved field 44) are both set to '1'. In FIG. 15 and the following description, bit numbers B1 to B4 refer to bits of the Control PHY Header (e.g. for the bit numbering as illustrated in FIG. 5A). The bracketed bit numbers (B0) to (B3) refer to an alternative numbering of the bits, for example a numbering of the bits of the Scrambler Initialization Field itself, starting at B0. In the scrambling operation, when bits B1 and B2 are '0' and Bits B3 and B4 are reserved, this indicates the presence of the control trailer. When bit B1 is '0', B2 is '1' and Bits B3 and B4 are reserved, this indicates the presence of the EDMG-Header-A field, which implies that the PPDU is an EDMG control mode PPDU. When bit B1 is '1' and when the PPDU contains an RTS or DMG CTS frame, the Channel BW field indicates the bandwidth of the PPDU. Otherwise the Channel BW field is reserved. That is, setting both bits B1 and B2 of the Control PHY Header field 16a to '0' is used to indicate the presence of a control trailer; and setting bit B1 to '0' and bit B2 to '1' is used to indicate the presence of the EDMG-Header-A field. In either case, bits B3 and B4 of the Control PHY Header field 16a are reserved. Further, setting bit B1 of the Control PHY Header field 16a to '1', and further when the PPDU associated with the Control PHY Header contains an RTS or (DMG) CTS frame, bits B2 to B4 of the Control PHY Header field 16a are used to indicate the bandwidth of the PPDU. It is noted that, in some embodiments, the Scrambler Initialization Field for the OFDM PHY Header as illustrated in FIG. 5B or the SC PHY Header as illustrated in FIG. 5C can be defined similarly according to the principles illustrated in FIG. 15.

In FIGS. 15 and 17, reference [1] in the first row, rightmost column refers to a version of the IEEE document "P802.11ay™/D0.3; 10 Draft Standard for Information Technology; Telecommunications and Information Exchange Between Systems—Local and Metropolitan Area Networks—Specific Requirements—Part 11: Wireless LAN Medium Access Control (MAC) and Physical Layer (PHY) Specifications, Amendment 7: Enhanced throughput for operation in license-exempt bands above 45 GHz," IEEE Computer Society, March 2017.

Referring to FIG. 16, an example definition for the Channel BW field in (i.e. indicated via) bit field B1, B2 and B3 as described above is presented. In this definition, it is assumed there are four options for the channels making up desired channelization: i) N; ii) N+1; iii) N+2; and, iv) N+3. As shown in FIG. 15, N is the value of the lowest channel number over which the PPDU is transmitted. We also assume that there are four available bandwidth options: a) 2.16 GHz; b) 4.32 GHz; c) 6.48 GHz; and, d) 8.64 GHz. The Channel BW field value is interrelated to these options. For instance, if 2.16 GHz is the desired channel bandwidth, the Channel BW field value will be set to zero and all the channels from N to N+3, will be available independent from the other channels. If 4.32 GHz is the desired channel bandwidth, the Channel BW field value is set to '1' if N is even and set to 2 if N is odd. Channels N and N+1, or Channels N+2 and N+3, can be used for channelization. The channel BW field value in FIG. 16 is a numerical value between 0 and 5 which is encoded into the Channel BW field using a three-bit binary representation.

As illustrated in FIG. 17, an embodiment of a definition of a channel bandwidth indication in a PHY Header (e.g. a Control PHY Header) according to the present disclosure is presented.

In FIG. 17 and the following description, bit numbers B1 to B4 refer to bits of the Control PHY Header (e.g. for the bit numbering as illustrated in FIG. 5A). The bracketed bit numbers (B0) to (B3) refer to an alternative numbering of the bits, for example a numbering of the bits of the Scrambler Initialization Field itself, starting at B0. In the scrambling operation, bits B1 and B2 being '0' and bits B3 and B4 being Pseudo Random indicate the presence of the control trailer. Bits B1 being '0', B2 being '1' and B3 and B4 being Pseudo Random indicate the presence of the EDMG-Header-A field, which implies that the PPDU is an EDMG control mode PPDU. That is to say, setting B1 and B2 to '1' indicates the presence of the control trailer; and setting B1 to '0' and B2 to '1' indicates the presence of the EDMG-Header-Field. In either case, B3 and B4 can be set pseudorandomly. When bit B1 is '1' and when the PPDU contains an RTS or DMG CTS frame, the Channel BW field indicates the bandwidth of the PPDU. Otherwise the Channel BW field is set pseudorandomly (or alternatively reserved). The Channel BW field is defined as set in FIG. 18 or FIG. 16, where N is the value of the lowest channel number over which the PPDU is transmitted. This approach to using the scrambler initiation field in the IEEE 802.11ay L-Header of the control mode is backward compatible with IEEE 802.11ad. It is noted that, in some embodiments, the Scrambler Initialization Field for the OFDM PHY Header as illustrated in FIG. 5B or the SC PHY Header as illustrated in FIG. 5C can be defined similarly according to the principles illustrated in FIG. 17.

It is noted that, in FIG. 17, when bit B1 is '0', bits B3 and B4 are assigned values in a pseudorandom manner. As such, at least the portion of the Scrambler Initialization value being conveyed by bits B3 and B4 (of the Control PHY Header 16a) is assigned a value pseudorandomly. This tends toward providing randomization or "whiteness" of the scrambling operation, which is an intended feature of scrambling.

Example 7—Channel BW Field

Referring to FIG. 18, an example definition for the Channel BW field in bit field B1, B2 and B3 of the Scrambler Initialization Field of a PHY Header field (e.g. a Control PHY Header field, or another type of PHY Header field), according to an embodiment of the present disclosure is presented. In this example definition, it is assumed that only Channel 1 through Channel 4 exist (or are being considered) in EDMG channelization. Definitions for such numbered channels in the context of EDMG channelization would be readily understood by a worker skilled in the art. The channel BW for these channels is 2.16 GHz, i.e. 2.16 GHz each.

When the Channel BW field value is zero, the desired channel bandwidth is 2.16 GHz with Channels 1, 2, 3 or 4 being allocated, i.e. any one of these channels can be used for PPDU transmission. When the Channel BW field value is one, the desired channel bandwidth is 4.32 GHz with Channels 1-2, Channels 2-3 or Channels 3-4 being allocated. As used herein, a range of channels separate with a dash "-" indicates that this range of channels are bonded. When the Channel BW field value is two, the desired channel bandwidth is 6.48 GHz with Channels 1-3 or Channels 2-4 being allocated. When the Channel BW field value is three, the desired channel bandwidth is 8.64 GHz with Channels 1-4 being allocated. The Channel BW field value being equal to four indicates carrier aggregation of two channels having bandwidths of 2.16 GHz and 2.16 GHz, where the two channels are adjacent, i.e., Channel 1 & Channel 2, Channel 2 & Channel 3 or Channel 3 & Channel 4 are allocated. The Channel BW field value being equal to five indicates carrier aggregation of two channels having bandwidths of 2.16 GHz and 2.16 GHz, where the two channels are separated by one channel, i.e., Channel 1 & Channel 3 or Channel 2 & Channel 4 are allocated. The Channel BW field value being equal to six indicates carrier aggregation of two channels having bandwidths of 4.32 GHz and 4.32 GHz, where the two channels are adjacent channels, i.e., Channels 1-2 & Channels 3-4 are allocated. When the Channel BW field value is 7, the desired channel bandwidth is reserved and there is no channel allocation. That is to say, the Channel BW field value of 7 is reserved and is not associated with a channel bandwidth or channel allocation. The channel BW field value in FIG. 18 is a numerical value between 0 and 7 which is encoded into the Channel BW field using a three-bit binary representation expressed via bits B1, B2 and B3 of the PHY header field.

Example 8—Channel BW Field

Referring to FIG. 19, an example definition for the Channel BW field in bit field B1, B2 and B3 of the Scrambler Initialization Field of a PHY Header field (e.g. a Control PHY Header field or other type of PHY Header field), according to an embodiment of the present disclosure is presented. In this example definition, it is assumed that only Channel 1 through Channel 6 exist (or are being considered) in EDMG channelization. The channel BW for these channels is 2.16 GHz.

When the Channel BW field value is zero, the desired channel bandwidth is 2.16 GHz with Channels 1, 2, 3, 4, 5 or 6 being allocated. When the Channel BW field value is one, the desired channel bandwidth is 4.32 GHz with, Channels 1-2, Channels 2-3, Channels 3-4, Channels 4-5 or Channels 5-6 being allocated. When the Channel BW field value is two, the desired channel bandwidth is 6.48 GHz with, Channels 1-3, Channels 2-4, Channels 3-5 or Channels 4-6 being allocated. When the Channel BW field value is three, the desired channel bandwidth is 8.64 GHz with Channels 1-4, Channels 2-5 or Channels 3-6 being allocated. The Channel BW field value being equal to four indicates carrier aggregation of two channels having bandwidths of 2.16 GHz and 2.16 GHz, where the two channels are adjacent, i.e., Channel 1 & Channel 2, Channel 2 & Channel 3, Channel 3 & Channel 4, Channel 4 & Channel 5 or Channel 5 & Channel 6 are allocated. The Channel BW field value being equal to five indicates carrier aggregation of two channels having bandwidths of 2.16 GHz and 2.16 GHz, where the two channels are separated by one channel, i.e., Channel 1 & Channel 3, Channel 2 & Channel 4, Channel 3 & Channel 5, or Channel 4 & Channel 6 are allocated. The Channel BW field value being equal to six indicates carrier aggregation of two bonded channels having bandwidths of 4.32 GHz and 4.32 GHz, where the two channels are adjacent, i.e., Channels 1-2 & Channels 3-4 or Channels 2-3 & Channels 4-5 or Channels 3-4 & Channels 5-6 are allocated. The Channel BW field value being seven indicates carrier aggregation of two bonded channels having bandwidths of 4.32 GHz and 4.32 GHz, where the two channels are separated by one channel, i.e., Channels 1-2 & Channels 4-5 or Channels 2-3 & Channels 5-6 are allocated. The channel BW field value in FIG. 18 is a numerical value between 0 and 7 which is encoded into the Channel BW field using a three-bit binary representation expressed via bits B1, B2 and B3 of the PHY header field.

Example 9—Indication of MIMO Configuration in L-Header of EDMG SC and EDMG OFDM Mode Similar to bandwidth indication in L-Header as defined in IEEE 802.11ay Specification Framework Document (SFD), it is desirable that multiple-input multiple-output (MIMO) configuration also be indicated in the L-Header of (i.e. for) EDMG SC or EDMG OFDM mode. This may be desirable, for example, in order for the receiver to have enough time to prepare the RF circuitry for MIMO reception. Embodiments of the present disclosure thus provide MIMO configuration information, for example overloaded into one or more bits of the Scrambler Initialization Field or other bits carrying a scrambler initialization value.

Referring to FIG. 20, an example definition of bit allocation of Last RSSI field when transmitted using the EDMG SC or EDMG OFDM mode is presented. In this definition, the "IsSISO" field only indicates that the PPDU is single stream or multi-stream PPDU without detailed MIMO configurations. The Last RSSI field is illustrated in FIGS. 5B and 5C as fields 70 and 100, respectively. It should be emphasized that the bit numbers "B0" to "B3" in FIG. 20 refer to bit numbers of the Last RSSI field itself, not bit numbers of the overall header. That is, "B0" in FIG. 20 may correspond to "B41" in FIG. 5B or "B39" in FIG. 5C. Reference [1] in FIG. 20 again refers to the IEEE document "P802.11ay™/D0.3; 10 Draft Standard for Information Technology; Telecommunications and Information Exchange Between Systems—Local and Metropolitan Area Networks—Specific Requirements—Part 11: Wireless LAN Medium Access Control (MAC) and Physical Layer (PHY) Specifications, Amendment 7: Enhanced throughput for operation in license-exempt bands above 45 GHz," IEEE Computer Society, March 2017.

Referring to FIG. 21, an example prior art EDMG-Header-A field structure and definition for a Single User (SU) PPDU is presented. In this illustration, the "Number of SS" field indicates, in EDMG-Header-A, the number of spatial streams transmitted in the PPDU, which may be late for MIMO indication.

As illustrated in FIG. 22 an indication of MIMO configuration in L-Header of EDMG SC and EDMG OFDM mode is presented according to an embodiment of the present disclosure. In this embodiment, Bits B0, B1, B2, B3 and B4 are assigned values randomly or pseudo-randomly. Bits B5, B6 and B7 are indicative of the Number of spatial streams (SS). The value of bits B5, B6 and B7 plus one indicates the number of SSs transmitted in the PPDU. Bits B0 to B7 refer to bits of the L-Header, which represents the Scrambler Initialization Field. The bits are used to indicate the number of spatial streams used in the data portion of the corresponding PPDU. Thus, control information conveyed via the Scrambler Initialization Field, or otherwise overloaded with bits indicative of a scrambler initialization value, can include control information indicative of a number of spatial streams being transmitted, e.g. in a PPDU. Further, generally this example can limit the control features to be applied to Control frames, as well as be applicable to EDMG SC and EDMG OFDM frames.

Figure 23:
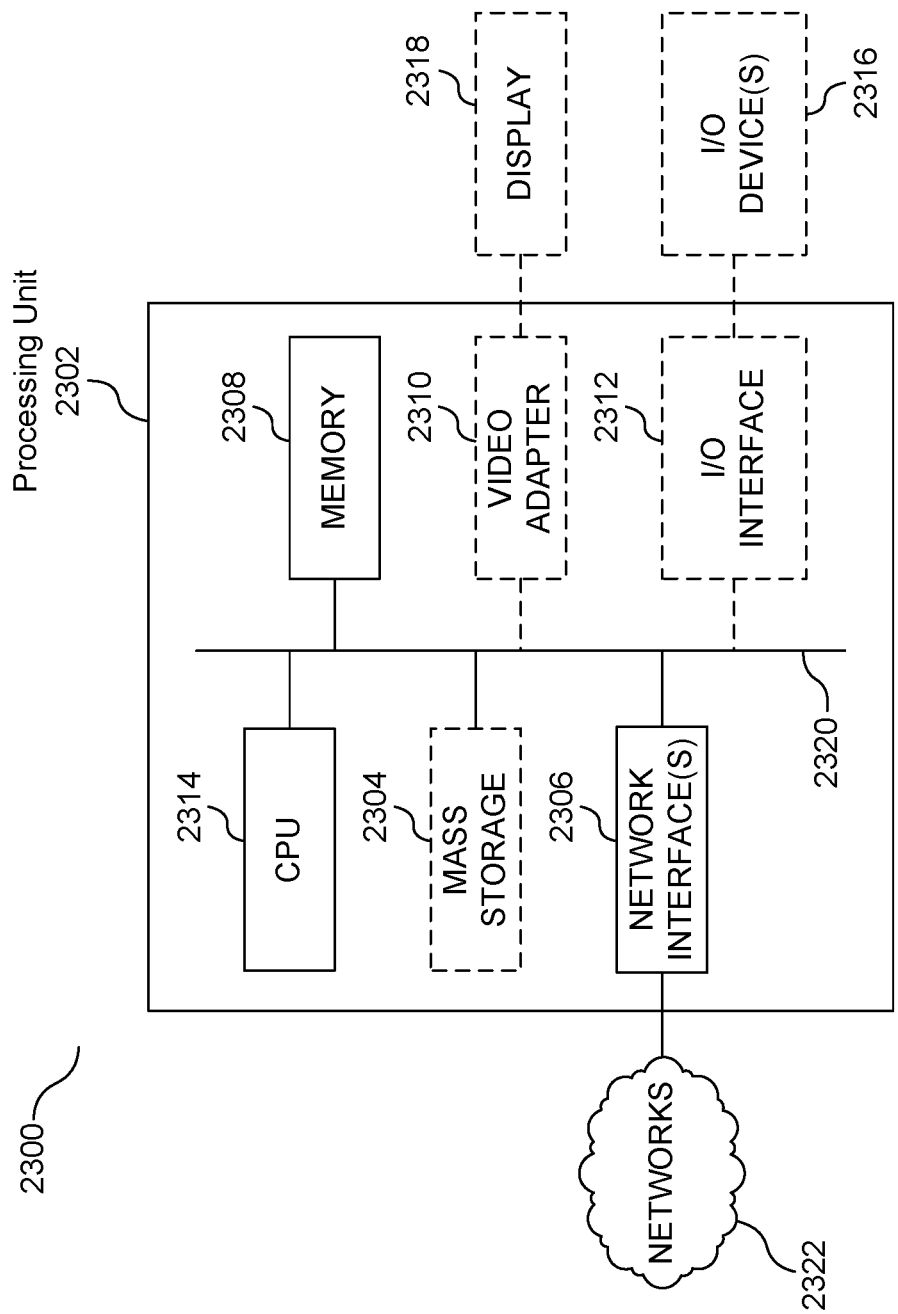
FIG. 23 illustrates an apparatus according to embodiments of the present disclosure.

FIG. 23 is a block diagram of a computing system 2300 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2300 includes a processing unit 2302. The processing unit 2302 typically includes a central processing unit (CPU) 2314, a bus 2320 and a memory 2308, and may optionally also include a mass storage device 2304, a video adapter 2310, and an I/O interface 2312 (shown in dashed lines).

The CPU 2314 may comprise any type of electronic data processor. The memory 2308 may comprise any type of non-transitory system memory such as static random access memory (SRAM), dynamic random access memory (DRAM), synchronous DRAM (SDRAM), read-only memory (ROM), or a combination thereof. In an embodiment, the memory 2308 may include ROM for use at boot-up, and DRAM for program and data storage for use while executing programs. The bus 2320 may be one or more of any type of several bus architectures including a memory bus or memory controller, a peripheral bus, or a video bus.

The mass storage 2304 may comprise any type of non-transitory storage device configured to store data, programs, and other information and to make the data, programs, and other information accessible via the bus 2320. The mass storage 2304 may comprise, for example, one or more of a solid state drive, hard disk drive, a magnetic disk drive, or an optical disk drive.

The video adapter 2310 and the I/O interface 2312 provide optional interfaces to couple external input and output devices to the processing unit 102. Examples of input and output devices include a display 2318 coupled to the video adapter 2310 and an I/O device 2316 such as a touch-screen coupled to the I/O interface 2312. Other devices may be coupled to the processing unit 2302, and additional or fewer interfaces may be utilized. For example, a serial interface such as Universal Serial Bus (USB) (not shown) may be used to provide an interface for an external device.

The processing unit 2302 may also include one or more network interfaces 2306, which may comprise wired links, such as an Ethernet cable, and/or wireless links to access one or more networks 2322. The network interfaces 2306 allow the processing unit 2302 to communicate with remote entities via the networks 2322. For example, the network interfaces 2306 may provide wireless communication via one or more transmitters/transmit antennas and one or more receivers/receive antennas. In an embodiment, the processing unit 2302 is coupled to a local-area network or a wide-area network for data processing and communications with remote devices, such as other processing units, the Internet, or remote storage facilities.

Through the descriptions of the preceding embodiments, the present invention may be implemented by using hardware only or by using software for execution on a hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, ROM, persistent RAM, or other non-transitory storage medium. The software product includes a number of instructions that enable a wireless connecting computing device to execute the methods provided in the embodiments of the present invention. The software product may include a number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A transmitter for transmitting a physical layer protocol data unit (PPDU) having a header, the header having a Scrambler Initialization Field, said transmitter comprising:
a scrambler initializer for overloading at least one bit of the Scrambler Initialization Field to carry control information, the control information indicating further corresponding operations in the transmitter including a channel bandwidth to be used by the transmitter;
a scrambler for scrambling content in the header following the Scrambler Initialization Field together with an associated MAC frame or a portion of the MAC frame to produce a scrambled sequence, said scrambling based on a scrambler initialization value conveyed via the Scrambler Initialization Field, and
an encoder for encoding the scrambled sequence, which is indicative of the content in the header together with the associated MAC frame or the portion of the MAC frame,
wherein the PPDU is an IEEE 802.11ay Control PHY PPDU.

2. The transmitter of claim 1, wherein the scrambler is configured to scramble the MAC frame or the portion of the MAC frame in such a manner that a receiver in receipt of the frame can descramble the portion of the frame based on contents of the Scrambler Initialization Field.

3. The transmitter of claim 1, wherein the scrambler initializer overloads fewer than all bits of the Scrambler Initialization Field to carry the control information.

4. The transmitter of claim 1, wherein the scrambler initializer overloads all bits of the Scrambler Initialization Field to carry the control information.

5. The transmitter of claim 1, wherein the control information further indicates at least one of: control information used to support EDMG features; a set of one or more channels to be used by the transmitter; a transmit diversity configuration to be used in communication; a transmit diversity configuration to be used in communication; and a number of spatial streams being transmitted.

6. The transmitter of claim 1, wherein the control information indicates a desired channel bandwidth of the PPDU.

7. The transmitter of claim 1, wherein the control information further conveys information for use in establishing a communication link with additional communication channel features.

8. The transmitter of claim 7, wherein the additional communication channel features include one or more of: selection of a primary channel, a designation of static or dynamic channel bandwidth, a multiple-input multiple output (MIMO) configuration type, and a transmit diversity setting.

9. The transmitter of claim 1, wherein overloading said at least one bit of the Scrambler Initialization Field comprises: obtaining a value to be conveyed by said at least one bit; and setting said at least one bit to correspond to an XOR operation which combines said value with a random or pseudo-random value also known to receivers of the PPDU.

10. The transmitter of claim 1 wherein the channel bandwidth used by the transmitter is a bandwidth of: one channel; a plurality of channel bonded channels; a plurality of aggregated channels; or a combination of one or more channel bonded channels and one or more aggregated channels.

11. A receiver for receiving a physical layer protocol data unit (PPDU) having a header, the header having a Scrambler Initialization Field, said receiver comprising:
a decoder configured to decode a scrambled sequence indicative of content of the header together with an associated MAC frame or portion of the associated MAC frame, the MAC frame being carried by the PPDU;
a scrambling data extractor configured to interpret at least one bit of the Scrambler Initialization Field as control information following decoding, the control information indicating further corresponding operations in the transmitter including a channel bandwidth to be used by the transmitter; and
a descrambler for descrambling said scrambled sequence, which is indicative of said content in the header together with the associated MAC frame or portion of the associated MAC frame, said descrambling being based on contents of the Scrambler Initialization Field,
wherein the PPDU is an IEEE 802.11ay Control PHY PPDU.

12. The receiver of claim 11, wherein fewer than all bits of the Scrambler Initialization Field are interpreted as carrying the control information.

13. The receiver of claim 11, wherein all bits of the Scrambler Initialization Field are interpreted as carrying the control information.

14. The receiver of claim 11, wherein the control information further indicates at least one of: control information used to support EDMG features; a set of one or more channels to be used by the transmitter; a transmit diversity configuration to be used in communication; a transmit diversity configuration to be used in communication; and a number of spatial streams being transmitted.

15. The receiver of claim 11, wherein the control information indicates a desired channel bandwidth of the PPDU.

16. The receiver of claim 11 wherein the channel bandwidth used by the transmitter is a bandwidth of: one channel; a plurality of channel bonded channels; a plurality of aggregated channels; or a combination of one or more channel bonded channels and one or more aggregated channels.

17. A method for transmitting a physical layer protocol data unit (PPDU) having a header, the header having a Scrambler Initialization Field, the method comprising, by a transmitter station having a scrambler initializer and a scrambler:
overloading, using the scrambler initializer, at least one bit of the Scrambler Initialization Field to carry control information, the control information indicating further corresponding operations in the transmitter including a channel bandwidth to be used by the transmitter;
scrambling, using the scrambler, content in the header following the Scrambler Initialization Field together with an associated MAC frame or a portion of the MAC frame to produce a scrambled sequence, said scrambling based on a scrambler initialization value conveyed via the Scrambler Initialization Field, and
an encoder for encoding the scrambled sequence, which is indicative of the content in the header together with the associated MAC frame or the portion of the MAC frame,
wherein the PPDU is an IEEE 802.11ay Control PHY PPDU.

18. The method of claim 17, wherein the portion of the PPDU is scrambled in such a manner that a receiver in receipt of the PPDU can descramble the portion of the PPDU based on contents of the Scrambler Initialization Field.

19. The method of claim 17, wherein the fewer than all bits of the Scrambler Initialization Field are overloaded to carry the control information.

20. The method of claim 17, wherein all bits of the Scrambler Initialization Field are overloaded to carry the control information.

21. The method of claim 17, wherein the control information further indicates at least one of: control information used to support EDMG features; a set of one or more channels to be used by the transmitter; a transmit diversity configuration to be used in communication; a transmit diversity configuration to be used in communication; and a number of spatial streams being transmitted.

22. The method of claim 17, wherein the control information indicates a desired channel bandwidth of the PPDU.

23. The method of claim 17 wherein the channel bandwidth used by the transmitter is a bandwidth of: one channel; a plurality of channel bonded channels; a plurality of aggregated channels; or a combination of one or more channel bonded channels and one or more aggregated channels.

24. A method for receiving a PPDU having a header, the header having a Scrambler Initialization Field, the method comprising, by a receiver having a decoder and a descrambler:
    using the decoder, decoding a scrambled sequence indicative of content in the header together with an associated MAC frame or portion of the associated MAC frame, the MAC frame being carried by the PPDU;
    interpreting, using the scrambling data extractor and following decoding, at least one bit of the Scrambler Initialization Field as control information, the control information indicating further corresponding operations in the transmitter including a channel bandwidth to be used by the transmitter; and
    descrambling, using the descrambler, said scrambled sequence which is indicative of said content in the header together with the associated MAC frame or portion of the associated MAC frame, based on contents of the Scrambler Initialization Field,
    wherein the PPDU is an IEEE 802.11ay Control PHY PPDU.

25. The method of claim 24, wherein the control information further indicates at least one of: control information used to support EDMG features; a set of one or more channels to be used by the transmitter; a transmit diversity configuration to be used in communication; a transmit diversity configuration to be used in communication; and a number of spatial streams being transmitted.

26. The method of claim 24, wherein fewer than all bits of the Scrambler Initialization Field are interpreted as carrying the control information.

27. The method of claim 24, wherein all bits of the Scrambler Initialization Field are interpreted as carrying the control information.

28. The method of claim 24, wherein the control information indicates a desired channel bandwidth of the PPDU.

29. The method of claim 24 wherein the channel bandwidth used by the transmitter is a bandwidth of: one channel; a plurality of channel bonded channels; a plurality of aggregated channels; or a combination of one or more channel bonded channels and one or more aggregated channels.

* * * * *